United States Patent
Kusama et al.

(10) Patent No.: US 9,253,083 B2
(45) Date of Patent: Feb. 2, 2016

(54) NETWORK SYSTEM

(71) Applicant: KABUSHIKI KAISHA TOSHIBA, Minato-ku, Tokyo (JP)

(72) Inventors: Katsumi Kusama, Chofu (JP); Atsushi Takahashi, Tokyo (JP); Taro Takahashi, Fuchu (JP); Yasuhiro Terakado, Fuchu (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 222 days.

(21) Appl. No.: 13/967,252

(22) Filed: Aug. 14, 2013

(65) Prior Publication Data
US 2013/0329549 A1 Dec. 12, 2013

Related U.S. Application Data

(63) Continuation of application No. PCT/JP2012/053825, filed on Feb. 17, 2012.

(30) Foreign Application Priority Data

Feb. 18, 2011 (JP) ................................. 2011-033439

(51) Int. Cl.
*H04L 12/437* (2006.01)
*H04L 12/703* (2013.01)
*H04L 12/46* (2006.01)

(52) U.S. Cl.
CPC ............. *H04L 45/28* (2013.01); *H04L 12/437* (2013.01); *H04L 12/4645* (2013.01)

(58) Field of Classification Search
None
See application file for complete search history.

(56) References Cited

U.S. PATENT DOCUMENTS

| | | | | |
|---|---|---|---|---|
| 5,442,632 A * | 8/1995 | Burton et al. | ................ | 370/249 |
| 2003/0118042 A1 | 6/2003 | Nishida et al. | | |
| 2004/0057453 A1* | 3/2004 | Montgomery, Jr. | ...... | H04J 3/085 370/452 |
| 2006/0092856 A1* | 5/2006 | Mitsumori | ................ | H04L 1/22 370/254 |

(Continued)

FOREIGN PATENT DOCUMENTS

| | | |
|---|---|---|
| CN | 1668032 A | 9/2005 |
| JP | 2003-174479 A | 6/2003 |

(Continued)

OTHER PUBLICATIONS

International Search Report (ISR) dated Mar. 13, 2012 (and English translation thereof) issued in International Application No. PCT/JP2012/053825.

(Continued)

*Primary Examiner* — Hassan Phillips
*Assistant Examiner* — Ayanah George
(74) *Attorney, Agent, or Firm* — Holtz, Holtz & Volek PC

(57) ABSTRACT

According to an aspect, a network system comprises a ring-type network, and a master transmission apparatus. The master transmission apparatus includes blocking unit, conversion unit and transmission unit. The blocking unit prohibits relay of the transmission frame received through a first virtual transmission line and a second virtual transmission line. The conversion unit changes transmission path information included in the transmission frame from the first virtual transmission line to the second virtual transmission line. The transmission unit transmits the transmission frame including the transmission path information changed by the conversion unit.

10 Claims, 19 Drawing Sheets

(56) References Cited

U.S. PATENT DOCUMENTS

| | | | |
|---|---|---|---|
| 2009/0168647 A1 | 7/2009 | Holness et al. | |
| 2010/0110881 A1* | 5/2010 | Ryoo | H04L 12/42 370/225 |
| 2010/0124417 A1 | 5/2010 | Kawaguchi et al. | |
| 2010/0165834 A1 | 7/2010 | Holness et al. | |
| 2010/0195649 A1 | 8/2010 | Miyata | |

FOREIGN PATENT DOCUMENTS

| | | |
|---|---|---|
| JP | 2008-92045 A | 4/2008 |
| JP | 4448467 B2 | 4/2010 |
| JP | 2010-183143 A | 8/2010 |
| WO | 2008130620 A1 | 10/2008 |

OTHER PUBLICATIONS

Japanese Office Action dated Jun. 11, 2013 (and English translation thereof) issued in counterpart Japanese Application No. 2011-033439.

English translation of an International Preliminary Report on Patentability (IPRP) dated Aug. 22, 2013 in parent International Application No. PCT/JP2012/053825.

Extended European Search Report dated Apr. 29, 2015, issued in counterpart European Application No. 12746524.3.

Chinese Office Action (and English translation thereof) dated Mar. 19, 2015, issued in counterpart Chinese Application No. 201280003414.9.

Chinese Office Action (and English translation thereof) dated Sep. 28, 2015, issued in counterpart Chinese Application No. 201280003414.9.

* cited by examiner

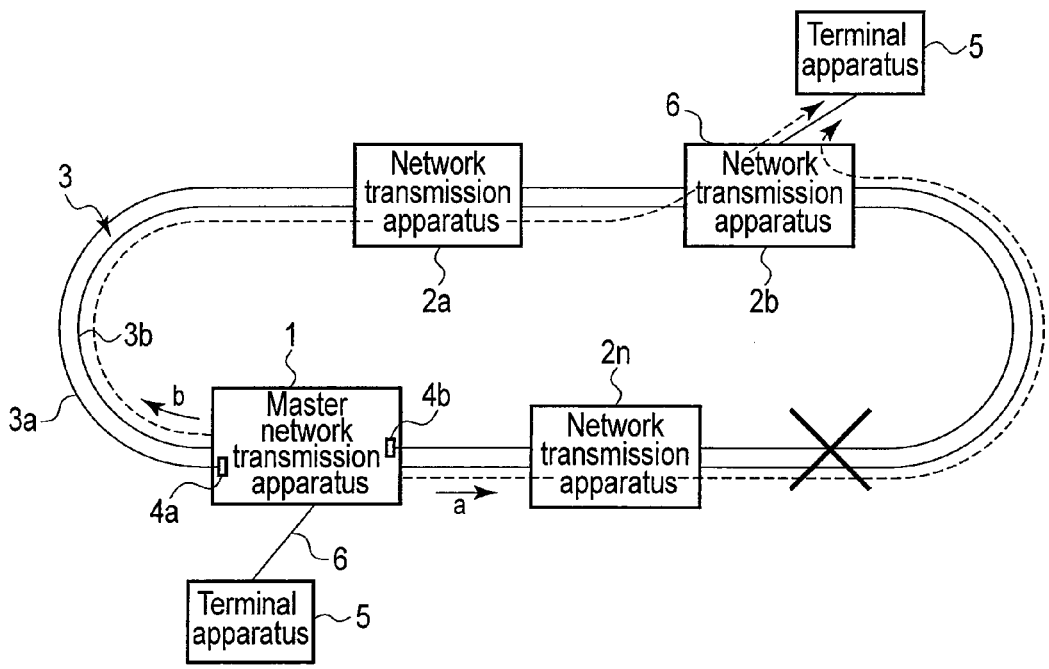
F I G. 5
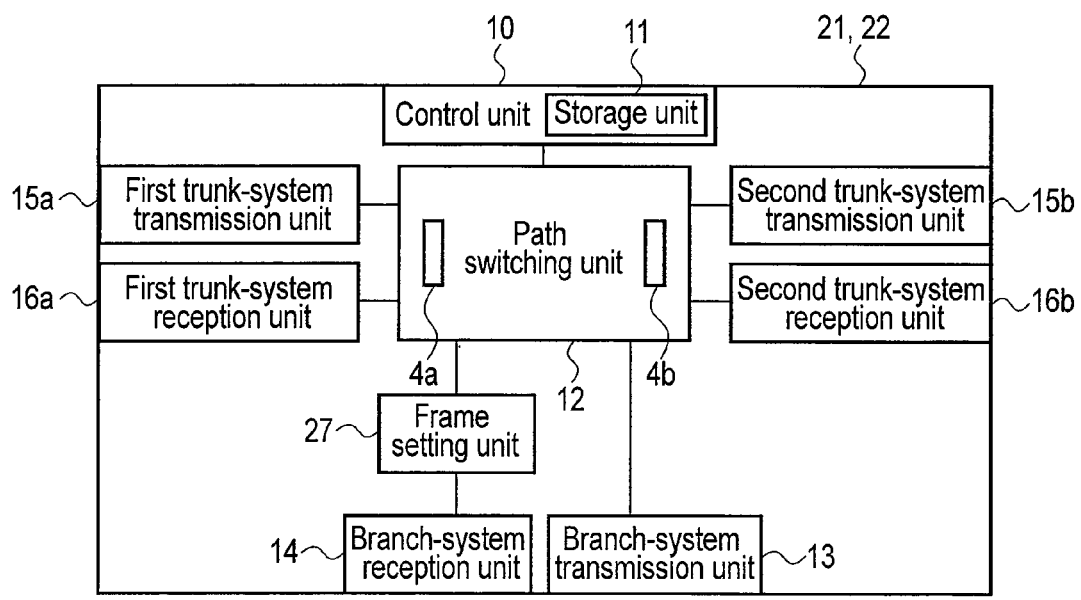
F I G. 6

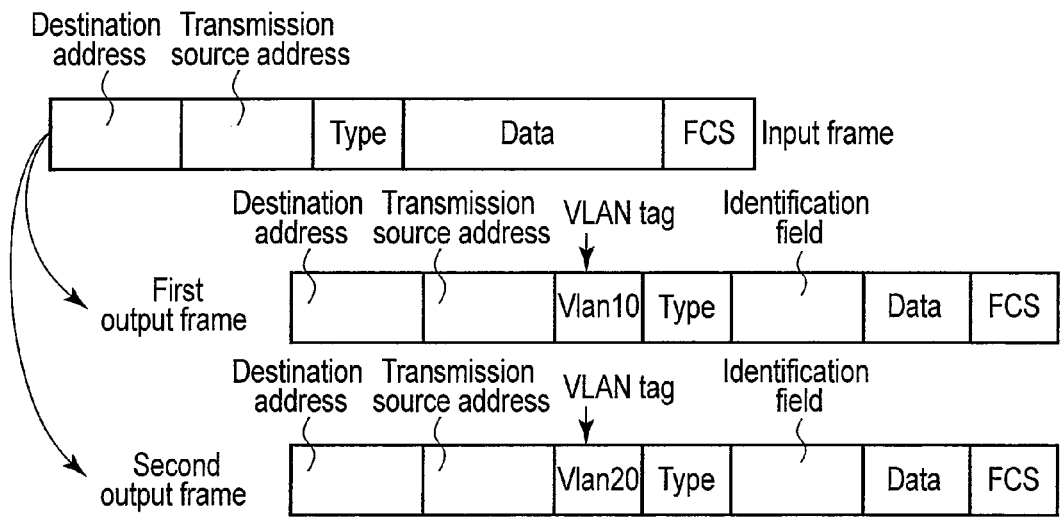
F I G. 9
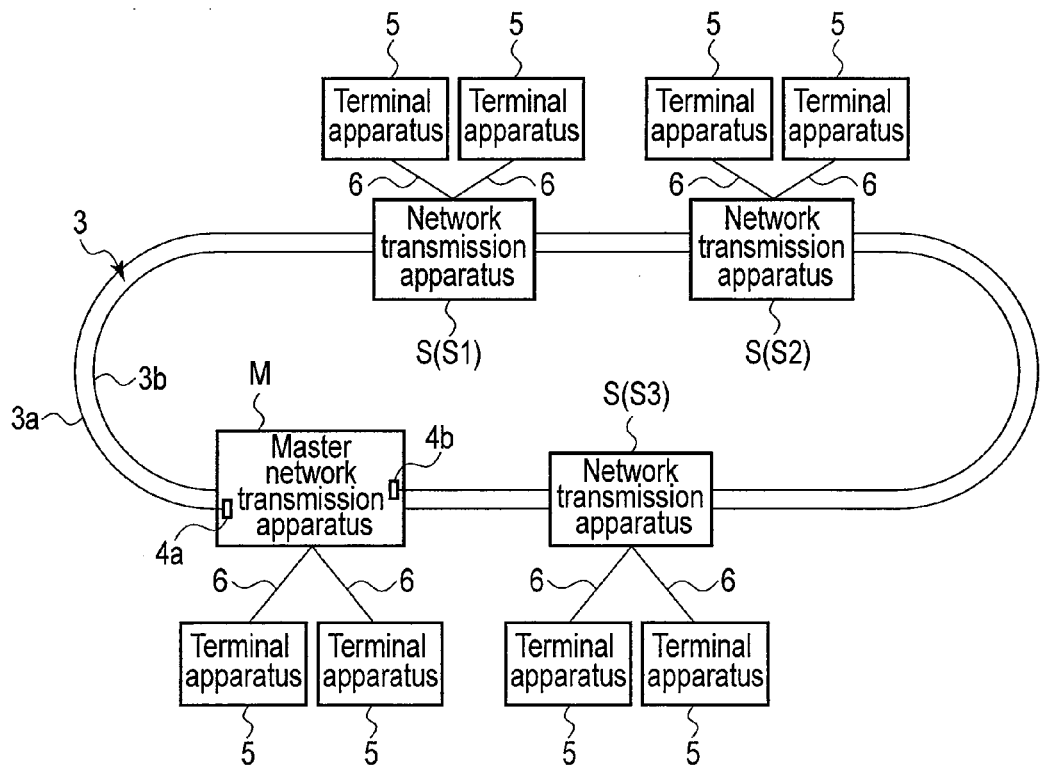
F I G. 10

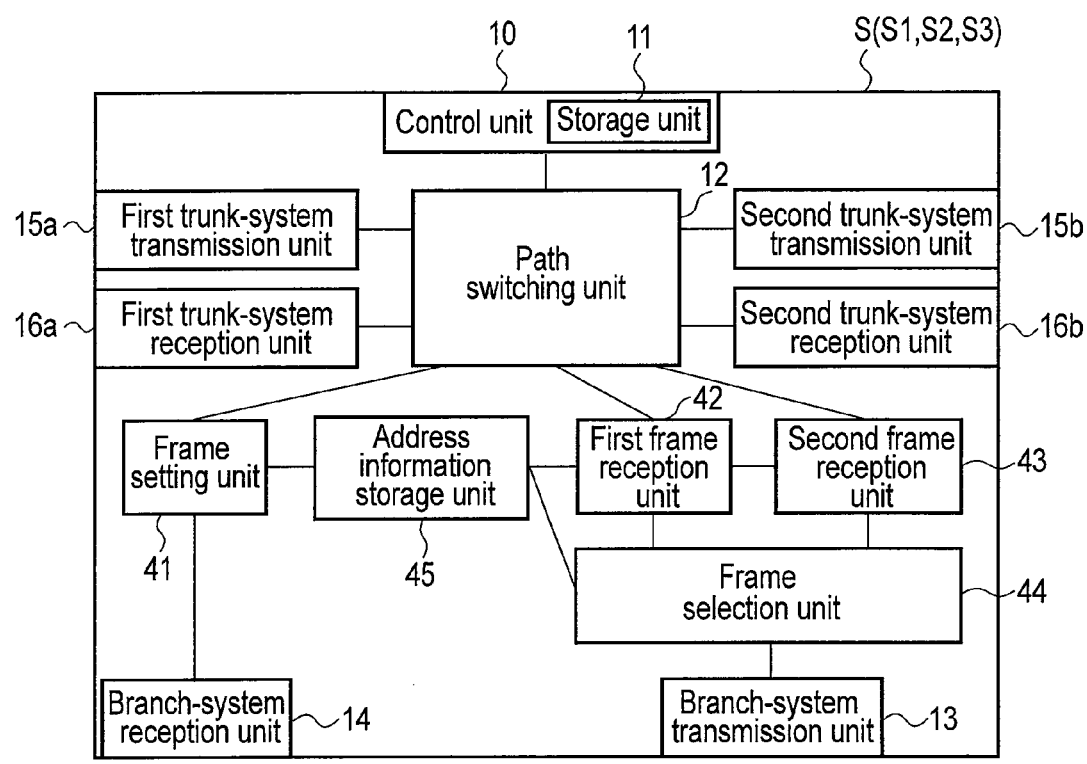
F I G. 12

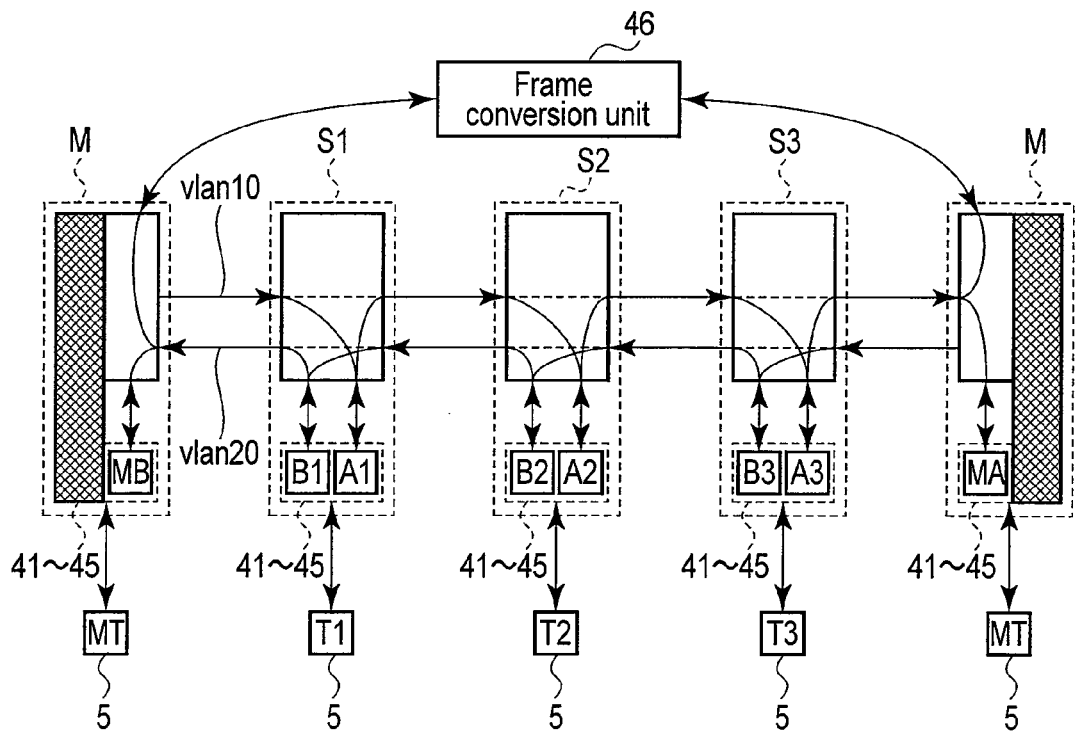
F I G. 13
| | | Transmission source address | | Terminal address | | | |
|---|---|---|---|---|---|---|---|
| | | | | MT | T1 | T2 | T3 |
| | | | | Destination address | | | |
| Terminal address | MT | Vlan10 | MA | — | A1 | A2 | A3 |
| | | Vlan20 | MB | — | B1 | B2 | B3 |
| | T1 | Vlan10 | A1 | MA | — | A2 | A3 |
| | | Vlan20 | B1 | MB | — | A2 | A3 |
| | T2 | Vlan10 | A2 | MA | B1/A1 | — | A3 |
| | | Vlan20 | B2 | MB | — | — | A3 |
| | T3 | Vlan10 | A3 | MA | A1/B1 | A2/B2 | — |
| | | Vlan20 | B3 | MB | — | — | — |
F I G. 14

| | | Terminal address | | | | | | |
|---|---|---|---|---|---|---|---|---|
| | | MT | T1 | T2 | T3 | | Mm | | Tn |
| | Transmission source address | Destination address | | | | | | |
| MT | Vlan10 MA | — | A1 | A2 | A3 | | Am | An |
| | Vlan20 MB | — | B1 | B2 | B3 | | Bm | Bn |
| T1 | Vlan10 A1 | MA | — | A2 | A3 | | Am | An |
| | Vlan20 B1 | MB | — | A2 | A3 | | Am | An |
| T2 | Vlan10 A2 | MA | B1/A1 | — | A3 | | Am | An |
| | Vlan20 B2 | MB | — | — | A3 | | Am | An |
| T3 | Vlan10 A3 | MA | A1/B1 | A2/B2 | — | | Am | An |
| | Vlan20 B3 | MB | — | — | — | | Am | An |
| | ... | | | | | ... | ... | ... |
| Tm | Vlan10 Am | MA | A1/B1 | A2/B2 | A3/B3 | | — | An |
| | Vlan20 Bm | MB | — | — | — | | — | An |
| | ... | | | | | | ... | ... |
| Tn-1 | Vlan10 An-1 | MA | A1/B1 | A2/B2 | A3/B3 | | An-1/Bn-1 | An |
| | Vlan20 Bn-1 | MB | — | — | — | | — | An |
| Tn | Vlan10 An | MA | A1/B1 | A2/B2 | A3/B3 | | An-1/Bn-1 | — |
| | Vlan20 Bn | MB | — | — | — | | — | — |

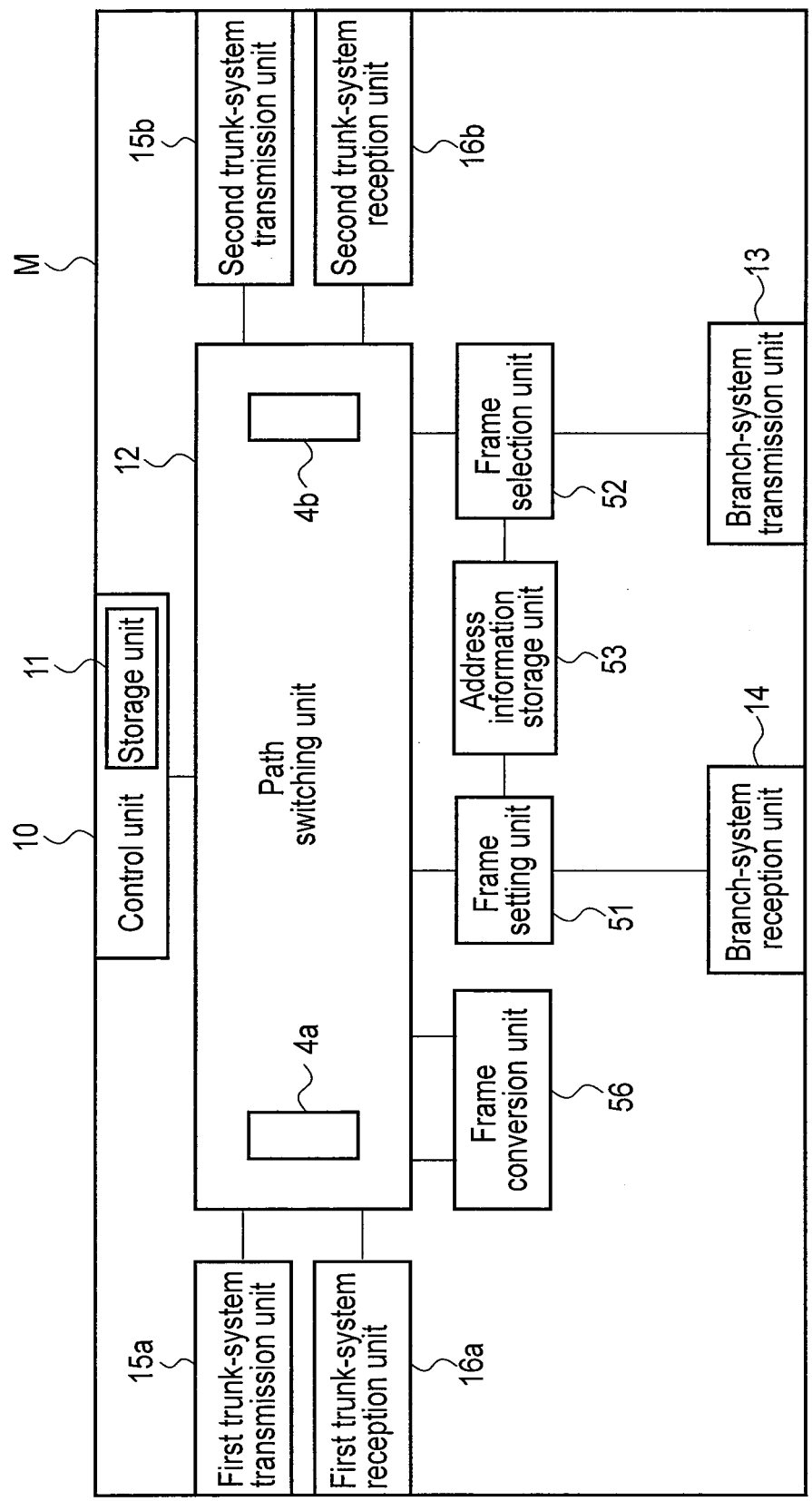
F I G. 19

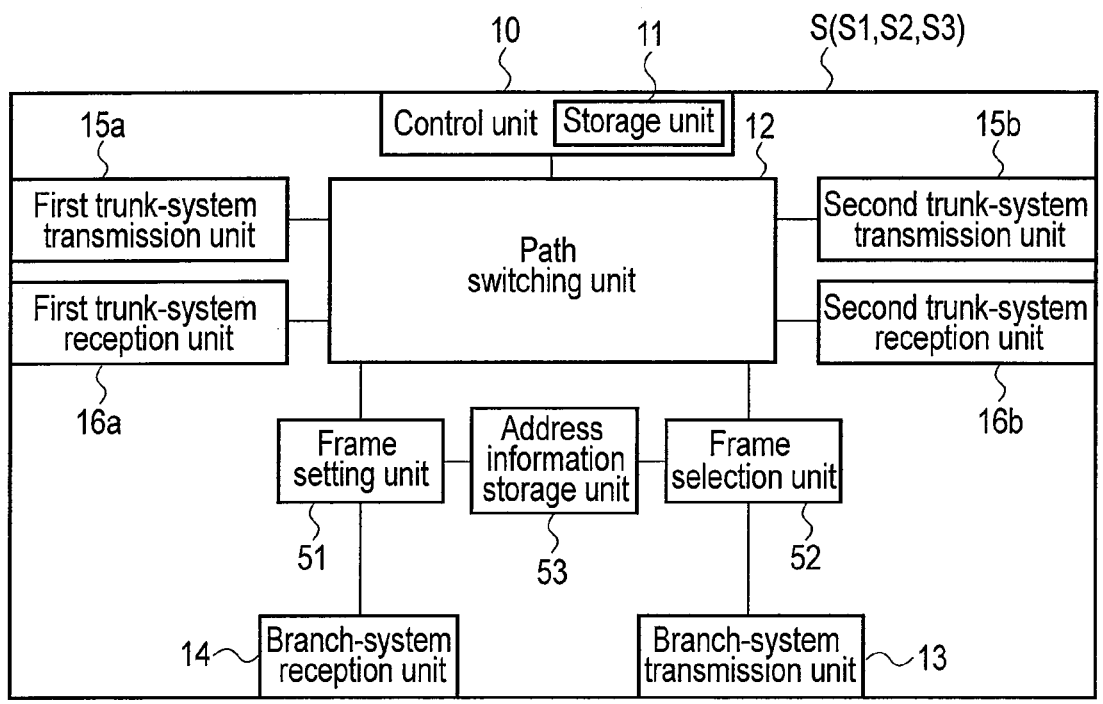
F I G. 20

| | | Transmission source address | | Terminal address | | | |
|---|---|---|---|---|---|---|---|
| | | | | MT | T1 | T2 | T3 |
| | | | | Destination address | | | |
| Terminal address | MT | Vlan10 | MA | — | A1 | A2 | A3 |
| | | Vlan20 | MB | — | A1 | A2 | A3 |
| | T1 | Vlan10 | A1 | MA | — | A2 | A3 |
| | | Vlan20 | A1 | MA | — | M1 | M1 |
| | T2 | Vlan10 | A2 | MA | A1/M2 | — | A3 |
| | | Vlan20 | A2 | MA | — | — | M1 |
| | T3 | Vlan10 | A3 | MA | A1/M2 | A2/M2 | — |
| | | Vlan20 | A3 | MA | — | — | — |

| | | | Terminal address | | | | | | |
|---|---|---|---|---|---|---|---|---|---|
| | | | MT | T1 | T2 | T3 | | Mm | | Tn |
| | | Transmission source address | Destination address | | | | | | | |
| Terminal address | MT | Vlan10 MA | — | A1 | A2 | A3 | | Am | | An |
| | | Vlan20 MA | — | A1 | A2 | A3 | | M1 | | M1 |
| | T1 | Vlan10 A1 | MA | — | A2 | A3 | | Am | | An |
| | | Vlan20 A1 | MA | — | M1 | M1 | | M1 | | M1 |
| | T2 | Vlan10 A2 | MA | A1/M2 | — | A3 | | Am | | An |
| | | Vlan20 A2 | MA | — | — | M1 | | M1 | | M1 |
| | T3 | Vlan10 A3 | MA | A1/M2 | A2/M2 | — | | Am | | An |
| | | Vlan20 A3 | MA | — | — | — | | — | | M1 |
| | | ... | | | | | ... | ... | ... | ... |
| | Tm | Vlan10 Am | MA | A1/M2 | A2/M2 | A3/M2 | | — | | An |
| | | Vlan20 Am | MA | — | — | — | | — | | M1 |
| | | ... | | | | | | ... | | ... |
| | Tn-1 | Vlan10 An-1 | MA | A1/M2 | A2/M2 | A3/M2 | | An-1/M2 | | An |
| | | Vlan20 An-1 | MA | — | — | — | | — | | M1 |
| | Tn | Vlan10 An | MA | A1/M2 | A2/M2 | A3/M2 | | An-1/M2 | | — |
| | | Vlan20 An | MA | — | — | — | | — | | — |

F I G. 25

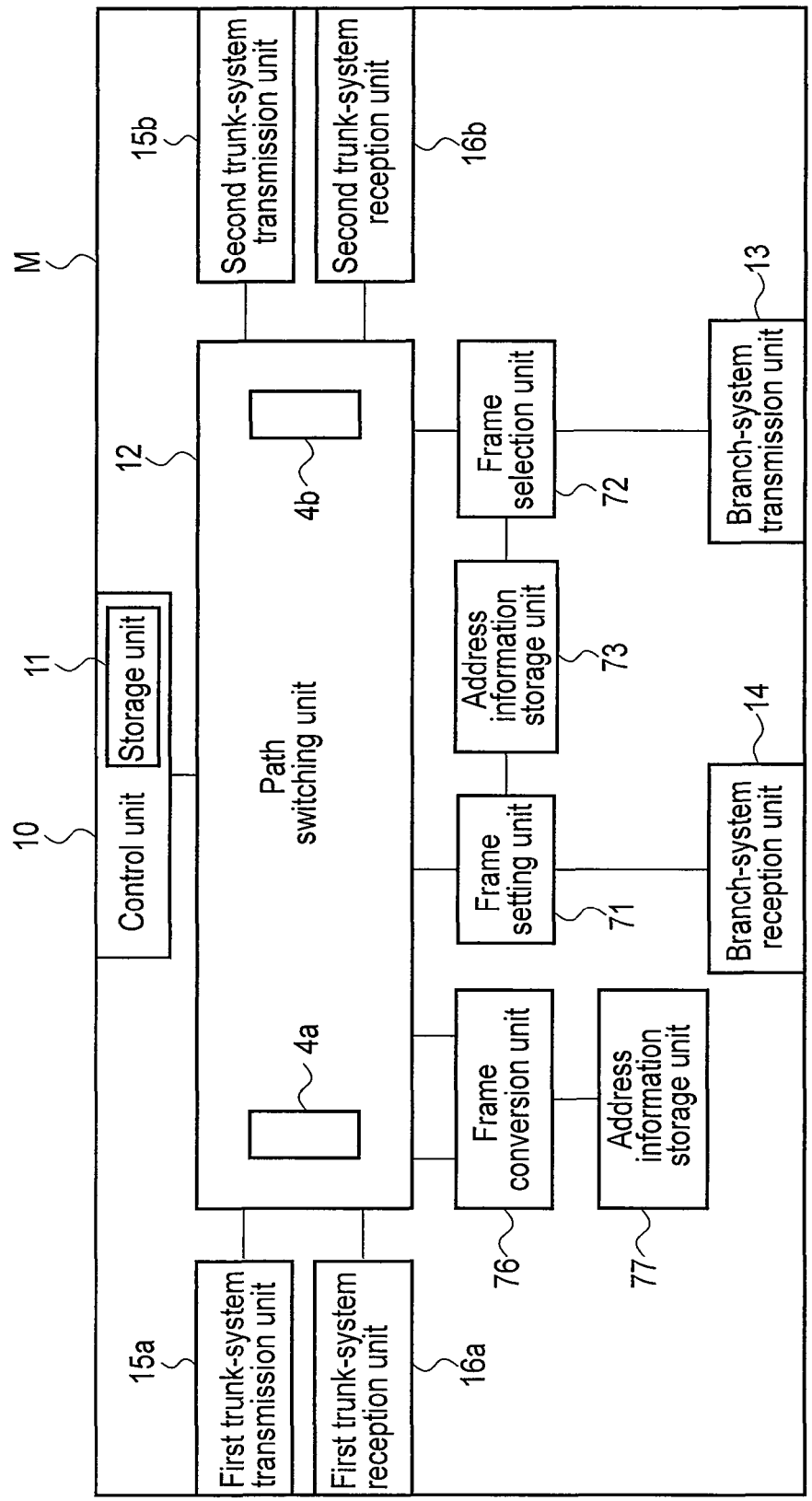
F I G. 28

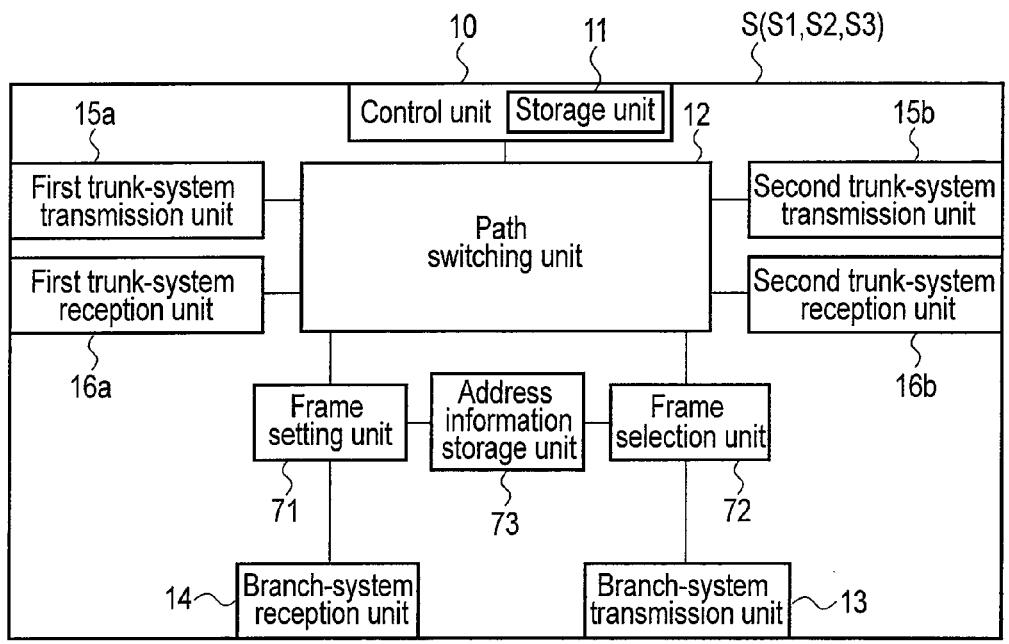
F I G. 29
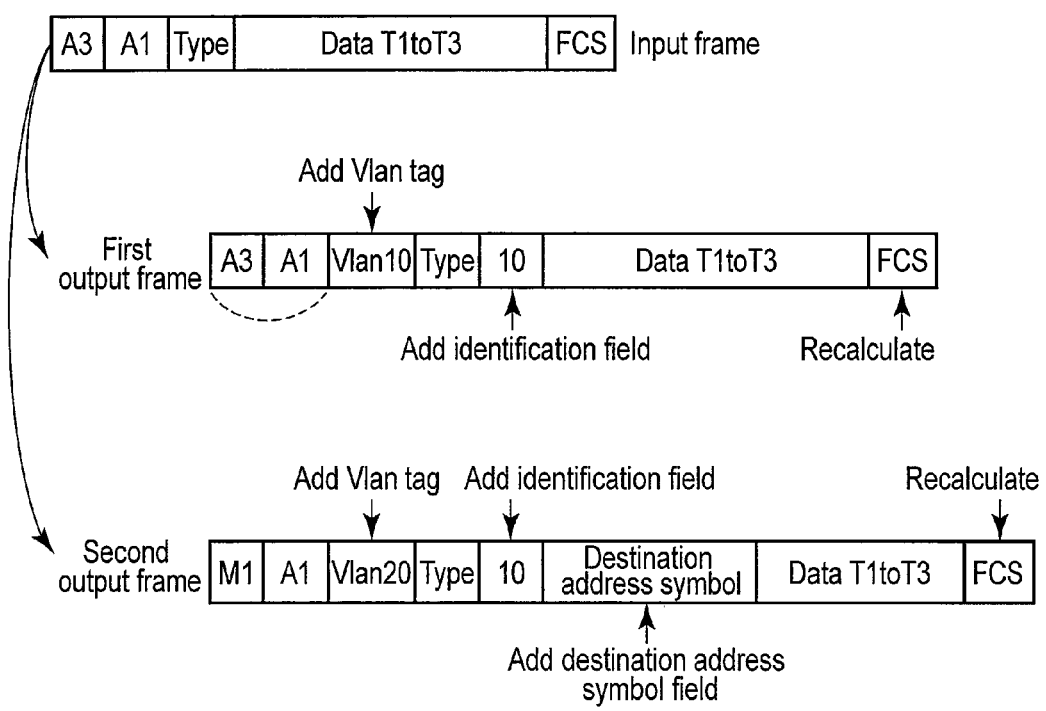
F I G. 30

NETWORK SYSTEM

CROSS REFERENCE TO RELATED APPLICATIONS

This application is a Continuation Application of PCT Application No. PCT/JP2012/053825, filed Feb. 17, 2012 and based upon and claiming the benefit of priority from prior Japanese Patent Application No. 2011-033439, filed Feb. 18, 2011, the entire contents of all of which are incorporated herein by reference.

BACKGROUND OF THE INVENTION

1. Field of the Invention

Embodiments described herein relate generally to a network system formed as, for example, a ring type.

2. Description of the Related Art

Conventionally, a ring-type network system is used as a network system that periodically transmits data to a plurality of terminal apparatuses. Such a network system is preferably capable of transmitting data that should be periodically transmitted without any loss even when, for example, a failure has occurred on part of the transmission path. In addition, using an apparatus employing Ethernet® for the physical layer and the data link layer as a network transmission apparatus is advantageous for the cost and member availability from the viewpoint of the degree of technical maturity and popularization. If an error has occurred on the apparatus or transmission line in the network system using such a network transmission apparatus, the transmission path is changed to avoid the error.

However, the conventional network system has the following problems. That is, an apparatus for monitoring the presence/absence of an error is necessary. Switching to change the path after the occurrence of an error is time-consuming. To shorten the switching time, the transmission apparatus becomes complex. Data may be lost at the time of switching. In addition, the network system may have physically duplexed transmission lines to improve the reliability of transmission. However, installing a plurality of transmission lines is expensive.

CITATION LIST

Non-Patent Literature

Non-Patent Literature 1: IEEE802.17

BRIEF SUMMARY OF THE INVENTION

Technical Problem

It is an object of the present invention to provide a ring-type network system capable of stably transmitting data.

Solution to Problem

According to an aspect, a network system comprises a ring-type network, and a master transmission apparatus. The master transmission apparatus includes blocking unit, conversion unit and transmission unit. The blocking unit prohibits relay of the transmission frame received through a first virtual transmission line and a second virtual transmission line. The conversion unit changes transmission path information included in the transmission frame from the first virtual transmission line to the second virtual transmission line. The transmission unit transmits the transmission frame including the transmission path information changed by the conversion unit.

BRIEF DESCRIPTION OF THE SEVERAL VIEWS OF THE DRAWING

FIG. 5 is a view showing an example of a failure that has occurred in the ring-type network system.

FIG. 6 is a block diagram showing an arrangement example of a master network transmission apparatus and a network transmission apparatus according to the second embodiment.

FIG. 9 is a view showing an example of creation of output frames by a frame setting unit according to the third embodiment.

FIG. 10 is a view showing an arrangement example of a network system according to the fourth embodiment.

FIG. 12 is a block diagram showing an arrangement example of a network transmission apparatus according to the fourth embodiment.

FIG. 13 is a view for explaining the procedure of transmission of transmission frames in the network system according to the fourth embodiment.

FIG. 14 is a view showing an example of address information according to the fourth embodiment.

FIG. 19 is a block diagram showing an arrangement example of a master network transmission apparatus according to the fifth embodiment.

FIG. 20 is a block diagram showing an arrangement example of a network transmission apparatus according to the fifth embodiment.

FIG. 25 is a view showing another example of the address information according to the fifth embodiment.

FIG. 28 is a block diagram showing an arrangement example of a master network transmission apparatus according to the seventh embodiment.

FIG. 29 is a block diagram showing an arrangement example of a network transmission apparatus according to the seventh embodiment.

FIG. 30 is a view showing an example of creation of output frames by a frame setting unit according to the seventh embodiment.

DETAILED DESCRIPTION OF THE INVENTION

The embodiments will now be described with reference to the accompanying drawings.

Figure 1:
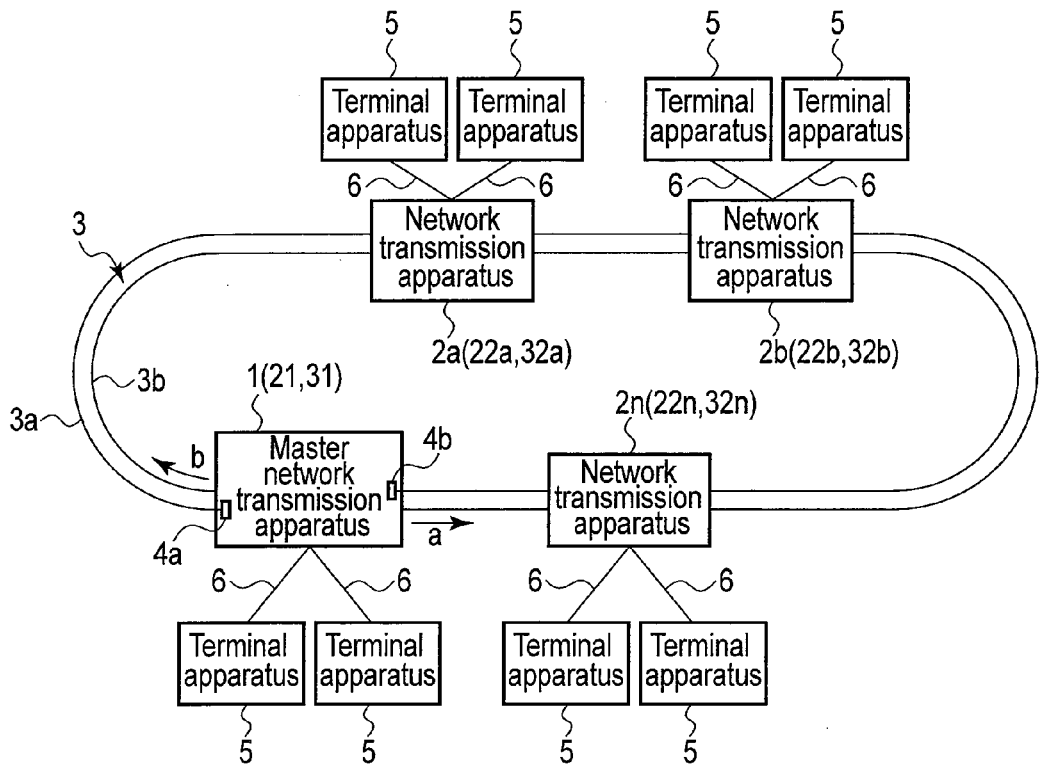
FIG. 1 is a view schematically showing an arrangement example of a ring-type network system according to the first embodiment.

FIG. 1 shows an arrangement example of a network system according to the first embodiment. As shown in FIG. 1, the network system is a ring-type network system.

The network system shown in FIG. 1 includes a master network transmission apparatus 1, a plurality of network transmission apparatuses 2 (2a, 2b, . . . ), and a trunk-system transmission line 3. Various kinds of terminal apparatuses 5 are connected to the master network transmission apparatus 1 and the network transmission apparatuses 2 via branch-system transmission lines 6. Note that referring to FIG. 1, each of the trunk-system transmission line 3 and the branch-system transmission lines 6 expresses a set of transmission and reception lines as one line. The number of network transmission apparatuses 2 or the number of terminal apparatuses 5 is not limited to that shown in FIG. 1.

The trunk-system transmission line 3 forms two virtual networks (VLANs) that logically separate the transmission line. For example, the trunk-system transmission line 3 includes a virtual transmission line 3a that forms a first VLAN, and a virtual transmission line 3b that forms a second VLAN. Both the first VLAN formed by the virtual transmission line 3a and the second VLAN formed by the virtual transmission line 3b are networks that connect the network transmission apparatuses 2 in a ring. The first VLAN formed by the virtual transmission line 3a and the second VLAN formed by the virtual transmission line 3b transmit transmission frames only one round from the master network transmission apparatus 1 in directions opposite to each other.

That is, the master network transmission apparatus 1 includes a first blocking port 4a and a second blocking port 4b. The first blocking port 4a blocks the interface from transmitting, more than one round, a transmission frame that should be transmitted through the virtual transmission line 3a. The second blocking port 4b blocks the interface from transmitting, more than one round, a transmission frame that should be transmitted through the virtual transmission line 3b in the direction opposite to the virtual transmission line 3a. In the arrangement example shown in FIG. 1, the master network transmission apparatus 1 transmits a transmission frame only one round counterclockwise (in a direction a shown in FIG. 1) through the ring-type network serving as the first VLAN formed by the virtual transmission line 3a, and transmits a transmission frame only one round clockwise (in a direction b shown in FIG. 1) through the ring-type network serving as the second VLAN formed by the virtual transmission line 3b.

Figure 2:
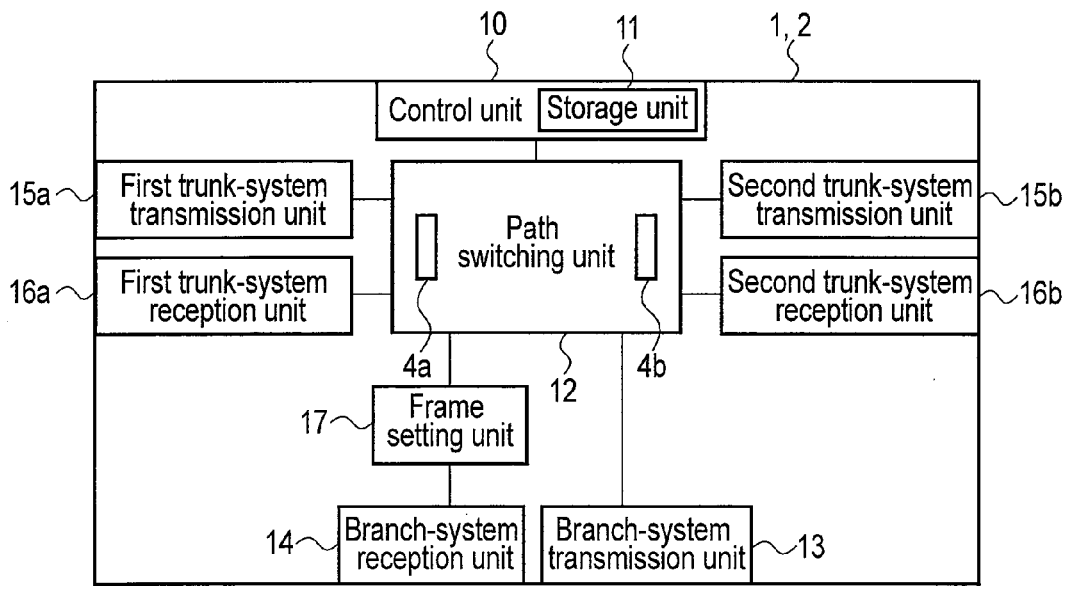
FIG. 2 is a block diagram showing an arrangement example of a master network transmission apparatus and a network transmission apparatus according to the first embodiment.

FIG. 2 is a block diagram showing an arrangement example of the master network transmission apparatus 1 and the network transmission apparatus 2.

Each of the master network transmission apparatus 1 and the network transmission apparatuses 2 (2a, 2b, . . . , 2n) includes a control unit 10, a storage unit 11, a path switching unit 12, a branch-system transmission unit 13, a branch-system reception unit 14, a first trunk-system reception unit 16a, a second trunk-system reception unit 16b, a first trunk-system transmission unit 15a, a second trunk-system transmission unit 15b, and a frame setting unit 17. The master network transmission apparatus 1 further includes the first blocking port 4a and the second blocking port 4b in the path switching unit 12. The path switching unit 12 of the network transmission apparatus 2 does not have the functions of the first blocking port 4a and the second blocking port 4b. That is, each network transmission apparatus 2 can be implemented by removing the first blocking port 4a and the second blocking port 4b from the arrangement shown in FIG. 2.

The control unit 10 controls the path to transmit a transmission frame, which is switched by the path switching unit 12. The control unit 10 includes the storage unit 11 that stores path switching information. Based on the path switching information stored in the storage unit 11, the control unit 10 switches the transmission frame transmission path set by the path switching unit 12. The path switching unit 12 sets a transmission path based on the path switching information stored in the storage unit 11.

The branch-system transmission unit 13 and the branch-system reception unit 14 are interfaces (branch-system interfaces) to connect the terminal apparatus 5 to the network transmission apparatus 2 or the master network transmission apparatus 1. Each of the network transmission apparatuses 1 and 2 transmits data to the terminal apparatus 5 via the branch-system transmission unit 13, and receives data from the terminal apparatus 5 via the branch-system reception unit 14. Note that each of the network transmission apparatuses 1 and 2 may include a plurality of branch-system transmission units 13 and branch-system reception units 14.

The first trunk-system transmission unit 15a is an interface that transmits data through the first virtual transmission line 3a. The first trunk-system reception unit 16a is an interface that receives data through the first virtual transmission line 3a. The first trunk-system transmission unit 15a and the first trunk-system reception unit 16a function as the interfaces for the first VLAN formed by the first virtual transmission line 3a. The second trunk-system transmission unit 15b is an interface that transmits data through the second virtual transmission line 3b. The second trunk-system reception unit 16b is an interface that receives data through the second virtual transmission line 3b. The second trunk-system transmission unit 15b and the second trunk-system reception unit 16b function as the interfaces for the second VLAN formed by the second virtual transmission line 3b.

The path switching unit 12 of the master network transmission apparatus 1 includes the first blocking port 4a and the second blocking port 4b. The first blocking port 4a and the second blocking port 4b block the ring-type networks that make one round through the virtual transmission lines 3a and 3b.

The frame setting unit 17 sets transmission frames to be transmitted through the virtual transmission lines 3a and 3b. The frame setting unit 17 can be formed from an arithmetic device for performing data processing. For example, the frame setting unit 17 may be implemented by causing the processor of a computer connected to an existing network transmission apparatus to execute a control program. The frame setting unit 17 creates a first transmission frame (output frame) to be transmitted through the virtual transmission line 3a and a second transmission frame (output frame) to be transmitted through the virtual transmission line 3b from data (input frame) received by the terminal apparatus 5. The frame setting unit 17 outputs the two created transmission frames to the path switching unit 12. The path switching unit 12 transmits the two transmission frames created by the frame setting unit 17 through the virtual transmission lines 3a and 3b.

The arrangement of a transmission frame set by the frame setting unit 17 will be described next.

Figure 3:
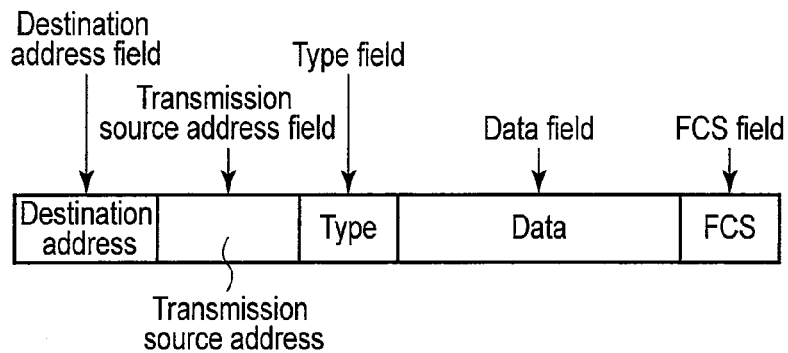
FIG. 3 is a view showing an example of a transmission frame input from a terminal apparatus to the network transmission apparatus.
Figure 4:
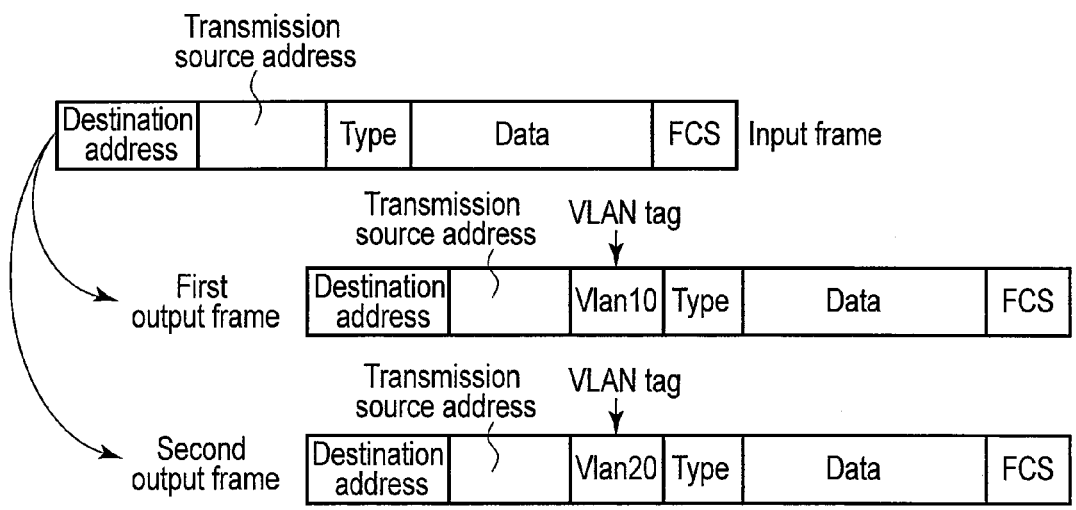
FIG. 4 is a view showing an example of creation of output frames by a frame setting unit according to the first embodiment.

FIG. 3 is a view showing an arrangement example of a transmission frame (input frame) input to the frame setting unit 17. FIG. 4 is a view showing an arrangement example of transmission frames (output frames) output from the frame setting unit 17.

The input frame is data the master network transmission apparatus 1 or the network transmission apparatus 2 receives from the terminal apparatus 5. In the arrangement example shown in FIG. 3, the input frame is formed from a plurality of fields such as a destination address field, a transmission source address field, a type field, a data field, and an FCS (transmission frame check sequence) field.

The frame setting unit 17 creates a plurality of output frames by adding different kinds of identification information to the input frame. The frame setting unit 17 creates, for each VLAN, an output frame by adding a virtual transmission line identification field for storing identification information to identify a virtual transmission line (VLAN) to the input frame. In the network that sets the virtual transmission lines 3a and 3b, the frame setting unit 17 creates a first output frame whose virtual transmission line identification field stores identification information for transmission through the virtual transmission line 3a and a second output frame whose virtual transmission line identification field stores identification information for transmission through the virtual transmission line 3b.

For example, as the identification information to identify a virtual transmission line to transmit a frame in an output frame, a tag (vlan tag) is used. For example, the vlan tag can use identification information defined by IEEE802.1Q. In the arrangement example shown in FIG. 4, the frame setting unit 17 creates a first output frame in which the virtual transmission line identification field (vlan tag field) added to the input frame stores "vlan 10" as a vlan tag, and a second output frame in which "vlan 20" is stored as a vlan tag. The path switching unit 12 discriminates the virtual transmission line to transmit each output frame based on the value of the virtual transmission line identification field in the output frame.

For example, the path switching unit 12 outputs the first output frame having the vlan tag "vlan 10" to the virtual transmission line 3a, and the second output frame having the vlan tag "vlan 20" to the virtual transmission line 3b. The two transmission frames (the first output frame and the second output frame) are transmitted through the network system in opposite directions. The two transmission frames have different vlan tags but the same destination. As a result, the two transmission frames having different vlan tags arrive at the network transmission apparatus connected to the terminal apparatus 5 of the destination.

FIG. 5 is a view showing the transmission state of a transmission frame in the case of a failure that has occurred on part of the transmission line of the network system.

The example shown in FIG. 5 indicates a state in which a transmission failure has occurred between the network transmission apparatus 2b and the network transmission apparatus 2n. FIG. 5 also illustrates a state in which the transmission frame is transmitted from the terminal apparatus 5 connected to the master network transmission apparatus 1 to the terminal apparatus connected to the network transmission apparatus 2b.

In the state shown in FIG. 5, no failure occurs in the transmission line counterclockwise (in the direction a shown in FIG. 5) from the master network transmission apparatus 1 to the network transmission apparatus 2b. For this reason, the first output frame transmitted through the virtual transmission line 3a is transmitted from the master network transmission apparatus 1 to the network transmission apparatus 2b. In the state shown in FIG. 5, a failure has occurred in the transmission line clockwise (in the direction b shown in FIG. 5) from the master network transmission apparatus 1 to the network transmission apparatus 2b. For this reason, the second output frame transmitted through the virtual transmission line 3b cannot be transmitted from the master network transmission apparatus 1 to the network transmission apparatus 2b.

That is, in the ring-type network system as shown in FIG. 5, one of the virtual transmission lines is ensured even when a failure has occurred on part of the transmission line. In other words, even when a failure has occurred on part of the transmission line, one of the two transmission frames arrives at the network transmission apparatus connected to the terminal apparatus of the destination. Additionally, in the ring-type network system, when a failure has occurred, a failure avoiding operation is performed by releasing a blocking port of the master network transmission apparatus. In this network system, the transmission frame is not lost because one of the virtual transmission lines is being ensured even during the time until completion of the failure avoiding operation.

As described above, in this network system, even when a failure has occurred on part of the transmission line, transmission without loss of data can be ensured. For example, in this network system, data transmission of a short period for the control system or the like can be done without loss during the occurrence of a transmission failure or during the time until completion of the failure avoiding operation accompanying the transmission failure. Note that in a network system required to perform transmission of a short period for a control system or the like, the amount of data to be transmitted is often small. Hence, the load on the overall network is supposedly not so heavy even when the transmission frame is duplexed.

As a modification of the above-described network system, data that has a large amount but allows a long transmission period or data that allows loss may be transmitted as a third output frame having a different vlan tag using a third virtual transmission line different from the first virtual transmission line for clockwise transmission and the second virtual transmission line for counterclockwise transmission. This form of network use is more efficient. This form can be implemented by separately preparing the branch-system transmission unit and the branch-system reception unit that are the input/output interfaces of the branch system in each network transmission apparatus, and the frame setting unit.

The second embodiment will be described next.

FIG. 6 is a block diagram showing an arrangement example of a master network transmission apparatus 21 and a network transmission apparatus 22 according to the second embodiment.

A network system according to the second embodiment is assumed to have an arrangement in which the master network transmission apparatus 1 and the network transmission apparatuses 2 shown in FIG. 1 are replaced with the master network transmission apparatus 21 and the network transmission apparatuses 22 shown in FIG. 6. In the network transmission apparatus 21 or 22 shown in FIG. 6, the function of a frame setting unit 27 is different from that of the frame setting unit 17 shown in FIG. 2. In addition, the master network transmission apparatus 21 includes blocking ports 4a and 4b shown in FIG. 6, and the network transmission apparatus 22 does not include the blocking ports 4a and 4b shown in FIG. 6.

Figure 7:
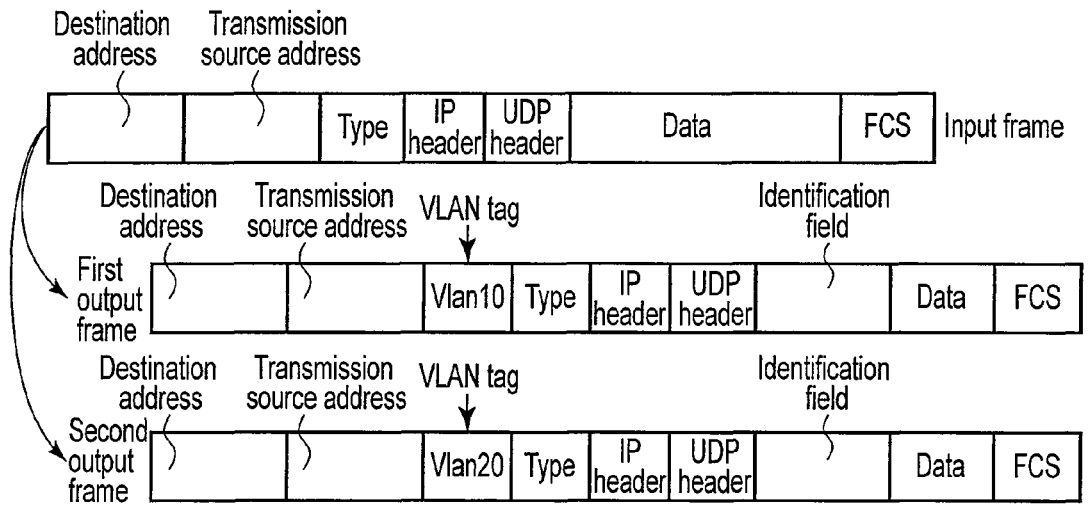
FIG. 7 is a view showing an example of creation of output frames by a frame setting unit according to the second embodiment.

FIG. 7 is a view showing an arrangement example of transmission frames output from the master network transmission apparatus 21 according to the second embodiment.

In the second embodiment, the frame setting unit 27 of the master network transmission apparatus 21 inserts, after the transmission frame header (after the type field), an identification field following an IP header and a UDP header in addition to the vlan tag field, as shown in FIG. 7. A value representing the contents of the transmission frame is set in the identification field. For example, the same value is set in the identification fields of transmission frames having data of the same contents except the vlan tags.

For two transmission frames having the same contents and to be transmitted through different virtual transmission lines, the frame setting unit 27 sets values (identification information) representing that the data are the same, but only the vlan tags are different in the identification fields. That is, the frame setting unit 27 duplicates a transmission frame input from a terminal apparatus 5, thereby creating two output frames. In the two output frames, the same value is set in the identification fields. However, the value of the identification field changes between transmission frames having data of different contents. For example, as the value of the identification field, a value that increments or decrements by a value in accordance with a predetermined rule is set for each transmission frame (a transmission frame having data of different contents) in the output order.

Every time one transmission frame is input from the terminal apparatus 5, the frame setting unit 27 of the master network transmission apparatus 21 sets transmission frames in which a value representing data of the same contents is set in the identification fields, and the vlan tags differ in accordance with the virtual transmission lines. A path switching unit 12 of the master network transmission apparatus 21 thus outputs a plurality of transmission frames in which the value representing data of the same contents is set in the identification fields to the virtual transmission lines corresponding to the values of the vlan tags. Upon receiving these transmission frames, the terminal apparatus 5 can select a necessary transmission frame based on the value of the identification field of each received transmission frame. This allows to reduce the reception processing of the terminal apparatus 5.

A transmission frame selection method of the terminal apparatus 5 connected to the network transmission apparatus 22 according to the second embodiment will be described next.

In the network transmission apparatus 22 according to the second embodiment, all transmission frames for a terminal apparatus connected by a branch-system transmission line 6 are output to the terminal apparatus. In the network system according to the second embodiment, the terminal apparatus 5 receives the duplexed transmission frames (first and second output frames). Hence, the terminal apparatus selects a necessary transmission frame based on the values of the identification fields of the transmission frames supplied from the network transmission apparatus 22. As the transmission frame selection method, a first selection method and a second selection method are usable. In the first selection method, the value of the identification field to be received next is calculated (predicted), and a transmission frame whose identification field has the calculated value is selected. In the second selection method, a transmission frame whose identification field has the same value as in a received transmission frame is discarded (a transmission frame having a different value in the identification field is selected).

As the first frame selection method, the terminal apparatus 5 according to the second embodiment calculates the value of the identification field to be selected (received) next from the value of the identification field of a previously selected (received) transmission frame using the same calculation method as that on the transmitting side (the calculation method used by the frame setting unit of the master network transmission apparatus to calculate the value of the identification field of the next transmission frame). Upon receiving a transmission frame, the terminal apparatus 5 selects a transmission frame whose identification field has a value matching the calculated value of the next identification field, and discards the remaining transmission frames.

For example, assume that the frame setting unit 27 of the master network transmission apparatus 21 increments the value of the identification field by "1" for each transmission frame to be transmitted sequentially. In this case, if the value of the identification field of the previously selected transmission frame is "10", the terminal apparatus 5 selects, as the next transmission frame, a transmission frame having "11" obtained by incrementing "10" by "1" as the value of the identification field, and discards the remaining transmission frames.

As the second frame selection method, the terminal apparatus 5 according to the second embodiment may discard a transmission frame whose identification field has a value matching the value of the identification field of a selected (received) transmission frame, and select another transmission frame. The frame setting unit 27 of the master network transmission apparatus 21 sets a different value in the identification field of a transmission frame having data of different contents. For this reason, if the value of the identification field of an already selected transmission frame is "10", the terminal apparatus 5 discards a transmission frame having the value "10" in the identification field (a transmission frame received via another virtual transmission line), and selects another transmission frame.

The third embodiment will be described next.

In the third embodiment, the load of reception processing of a terminal apparatus 5 is reduced, and the transmission capacity of a branch-system transmission line can be decreased.

Figure 8:
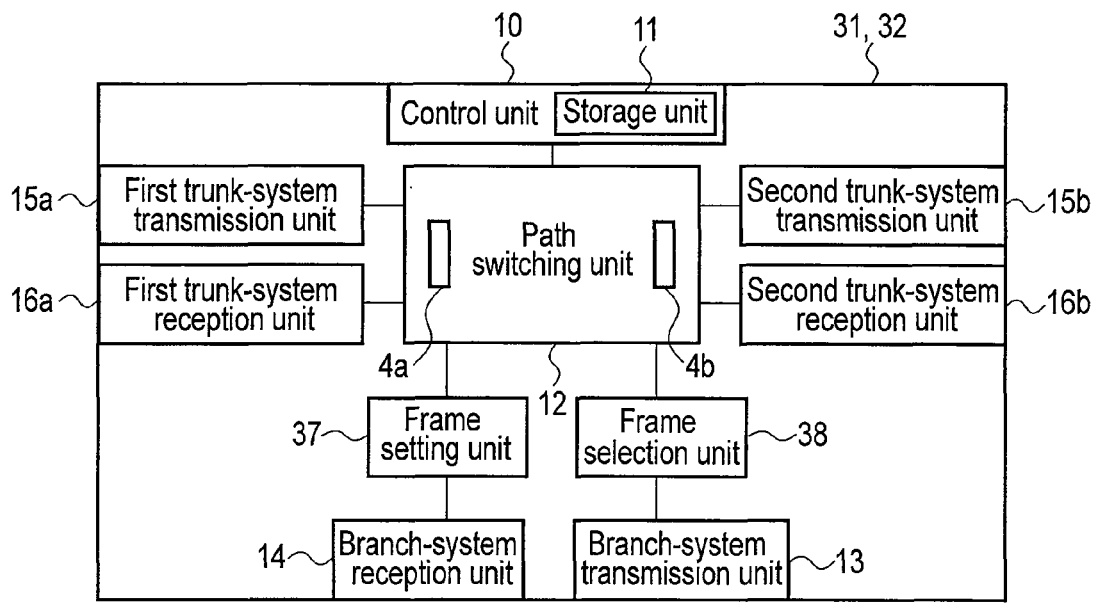
FIG. 8 is a block diagram showing an arrangement example of a master network transmission apparatus and a network transmission apparatus according to the third embodiment.

FIG. 8 is a block diagram showing an arrangement example of a master network transmission apparatus 31 and a network transmission apparatus 32 according to the third embodiment. Note that a network system according to the third embodiment is assumed to have an arrangement in which the master network transmission apparatus 1 and the network transmission apparatuses 2 shown in FIG. 1 are replaced with the master network transmission apparatus 31 and the network transmission apparatuses 32 shown in FIG. 8.

The master network transmission apparatus 31 and the network transmission apparatus 32 shown in FIG. 8 correspond to the master network transmission apparatus 1 and the network transmission apparatus 2 according to the first embodiment shown in FIG. 2. The network transmission apparatus 31 or 32 shown in FIG. 8 is different from the network transmission apparatus 1 or 2 shown in FIG. 2 in that a frame selection unit 38 is provided between a path switching unit 12 and a branch-system transmission unit 13. In the network transmission apparatus 31 or 32 shown in FIG. 8, the function of a frame setting unit 37 is different from that of the frame setting unit 17 shown in FIG. 2. Note that only the master network transmission apparatus 31 includes blocking ports 4a and 4b shown in FIG. 8, and the network transmission apparatus 32 does not include the blocking ports 4a and 4b shown in FIG. 8.

FIG. 9 is a view showing an example of transmission frames set by the frame setting unit 37 according to the third embodiment. Each output frame shown in FIG. 9 is different from the output frames shown in FIG. 3 in that an identification field is provided after the type field. The frame setting unit 37 duplicates a transmission frame input from the terminal apparatus 5, adds vlan tags corresponding to virtual transmission lines 3a and 3b to the respective duplicated transmission frames, and sets the same value in the identification fields.

As shown in FIG. 9, the frame setting unit 37 creates a first output frame and a second output frame from one input frame. The frame setting unit 37 sets, in the identification field, a value that changes (for example, increments or decrements) by a value in accordance with a predetermined rule for each transmission frame. As shown in FIG. 9, the frame setting unit 37 sets the same value in the identification fields of the first and second output frames of the same contents created from one input frame. The first and second output frames are output to a trunk-system transmission line 3 via the path switching unit 12. The first output frame is transmitted through the virtual transmission line 3a corresponding to the vlan tag, and the second output frame is transmitted through the virtual transmission line 3b corresponding to the vlan tag.

Each network transmission apparatus 32 connected to the trunk-system transmission line 3 receives the first output frame transmitted through the virtual transmission line 3a and the second output frame transmitted through the virtual transmission line 3b. In the network transmission apparatus 32, the frame selection unit 38 selects, from the received transmission frames, a transmission frame to be actually output to the terminal apparatus. The frame selection unit 38 selects, based on the value of the identification field, whether a transmission frame whose destination is the terminal apparatus 5 connected to the network transmission apparatus 32 is a transmission frame to be output to the terminal apparatus 5. The frame selection unit 38 deletes the identification field and the vlan tag from the selected transmission frame and outputs it to the destination terminal apparatus 5.

As described above, in the network system according to the third embodiment, the network transmission apparatus sorts the transmission frame to be output to the terminal apparatus. Hence, the transmission capacity of the branch-system transmission line for connecting the network transmission apparatus and the terminal apparatus does not increase. That is, the network system according to the third embodiment can reliably send data to the terminal apparatus 5 without increasing the capacity of the trunk-system transmission line even when a failure has occurred on part of the transmission line.

A transmission frame selection method of each network transmission apparatus 32 of the network system according to the third embodiment will be described next.

As described above, the network transmission apparatus 32 according to the third embodiment selects, for a transmission frame whose destination is the terminal apparatus connected to the network transmission apparatus out of the received transmission frames, whether the transmission frame is a transmission frame to be output to the terminal apparatus, based on the value of the identification field. As the transmission frame selection method, a first selection method and a second selection method are usable. In the first selection method, the value of the identification field to be received next is calculated (predicted) from the value of the identification field of a previously selected transmission frame, and a transmission frame having an identification field value equal to the calculated value is selected. In the second selection method, a transmission frame whose identification field has the same value as in a selected transmission frame is discarded (a transmission frame having a different value in the identification field is selected).

The frame selection unit 38 using the above-described first selection method calculates the value of the identification field to be selected next from the value of the identification field of a transmission frame selected (received) immediately before using the same calculation method as that on the transmitting side (the calculation method used by the frame setting unit of the master network transmission apparatus to calculate the value of the identification field of the next transmission frame). Upon receiving a transmission frame whose destination is the terminal apparatus 5 connected to the network transmission apparatus 32, the frame selection unit 38 selects a transmission frame whose identification field has a value matching the calculated value of the next identification field, and discards the remaining transmission frames.

For example, assume that the frame setting unit 37 of the master network transmission apparatus 31 increments the value of the identification field by "1" for each transmission frame to be transmitted sequentially. In this case, if the value of the identification field of the transmission frame selected immediately before is "10", the frame selection unit 38 selects a transmission frame having "11" obtained by incrementing "10" by "1" as the value of the identification field, and discards the remaining transmission frames.

The frame selection unit 38 using the above-described second selection method discards a transmission frame whose identification field has a value matching the value of the identification field of a selected transmission frame, and selects another transmission frame. The frame setting unit 37 of the master network transmission apparatus 31 sets a different value in the identification field of a transmission frame having data of different contents. For this reason, if the value of the identification field of an already selected transmission frame is "10", the terminal apparatus 5 discards a transmission frame having the value "10" in the identification field (a transmission frame received via another virtual transmission line), and selects another transmission frame.

As described above, in the network systems according to the first, second, and third embodiments, the master transmission apparatus transmits data of the same contents as a plurality of transmission frames through a plurality of virtual transmission lines. For this reason, in communication between the master network transmission apparatus and each network transmission apparatus, even when a failure has occurred on part of the transmission line, it is possible to transmit the transmission frames through one of the virtual transmission lines and maintain transmission without loss of transmission frames.

For example, a railway vehicle requires a network system that transmits data such as a control command from a control apparatus to devices (terminal apparatuses) installed at various portions of the vehicle. When the railway vehicle is equipped with the network system described in the first, second, or third embodiment, a system capable of maintaining transmission without loss of transmission frames can be implemented using a simple hardware arrangement (for example, a network configuration using existing hardware).

The fourth embodiment will be described next.

FIG. 10 is a view showing an arrangement example of a network system according to the fourth embodiment.

The network system according to the fourth embodiment shown in FIG. 10 has an arrangement in which the master network transmission apparatus 1 and the network transmission apparatuses 2 shown in FIG. 1 are replaced with a master network transmission apparatus M and network transmission apparatuses S (S1, S2, and S3). The number of network transmission apparatuses S or the number of terminal apparatuses 5 is not limited to that shown in FIG. 10.

Figure 11:
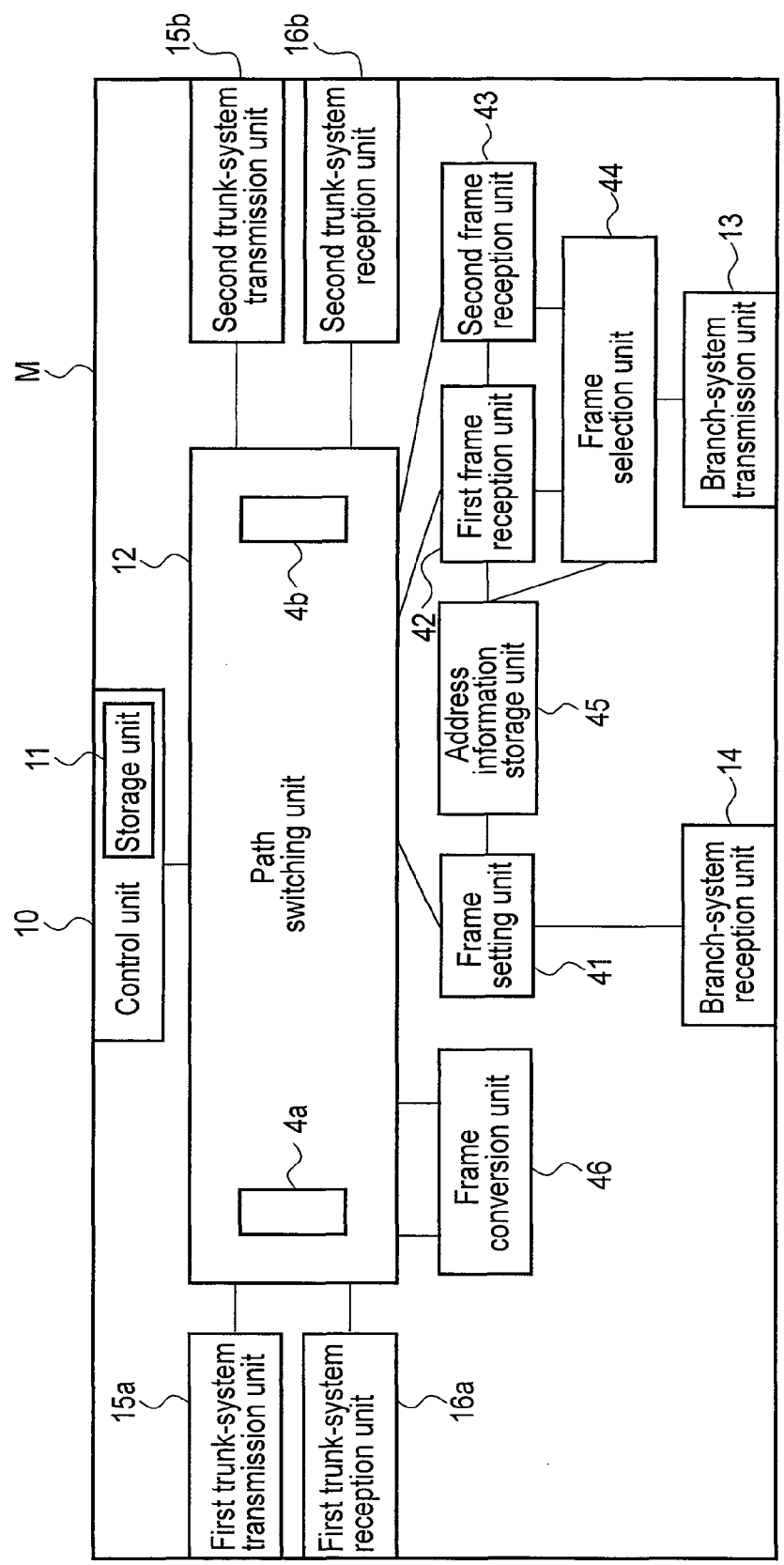
FIG. 11 is a block diagram showing an arrangement example of a master network transmission apparatus according to the fourth embodiment.

FIG. 11 is a block diagram showing an arrangement example of the master network transmission apparatus M. FIG. 12 is a block diagram showing an arrangement example of the network transmission apparatus S.

As shown in FIG. 11, the master network transmission apparatus M includes a control unit 10, a storage unit 11, a path switching unit 12, a branch-system transmission unit 13, a branch-system reception unit 14, a first trunk-system reception unit 16a, a second trunk-system reception unit 16b, a first trunk-system transmission unit 15a, a second trunk-system transmission unit 15b, a frame setting unit 41, a first frame reception unit 42, a second frame reception unit 43, a frame selection unit 44, an address information storage unit 45, and a frame conversion unit 46. The control unit 10, the storage unit 11, the path switching unit 12, the branch-system transmission unit 13, the branch-system reception unit 14, the first trunk-system reception unit 16a, the second trunk-system reception unit 16b, the first trunk-system transmission unit 15a, and the second trunk-system transmission unit 15b can be implemented by the same arrangement as in FIG. 1.

As shown in FIG. 12, the network transmission apparatus S includes the control unit 10, the storage unit 11, the path switching unit 12, the branch-system transmission unit 13, the branch-system reception unit 14, the first trunk-system reception unit 16a, the second trunk-system reception unit 16b, the first trunk-system transmission unit 15a, the second trunk-system transmission unit 15b, the frame setting unit 41, the first frame reception unit 42, the second frame reception unit 43, the frame selection unit 44, and the address information storage unit 45. The network transmission apparatus S can be implemented by the same arrangement as that of the master network transmission apparatus M except that the frame conversion unit 46 is omitted, and the path switching unit 12 has no blocking ports.

Note that in the master network transmission apparatus M or the network transmission apparatus S, each of the branch-system transmission unit 13, the branch-system reception unit 14, the frame setting unit 41, the first frame reception unit 42, the second frame reception unit 43, the frame selection unit 44, and the address information storage unit 45 may include a plurality of units.

An example of frame transmission control of the network system according to the fourth embodiment will be described below.

FIG. 13 is a view conceptually illustrating the input/output relationship of transmission frames transmitted among the master network transmission apparatus M and the network transmission apparatuses S1, S2, and S3 in the network system according to the fourth embodiment.

In the example shown in FIG. 13, a terminal apparatus MT is connected to the master network transmission apparatus M, and terminal apparatuses T1, T2, and T3 are connected to the network transmission apparatuses S1, S2, and S3, respectively. Note that FIG. 13 illustrates the master network transmission apparatus M as two functionally divided blocks. The master network transmission apparatus M on the left side of FIG. 13 represents a functional portion for processing an address belonging to a second vlan (the vlan tag is vlan 20). The master network transmission apparatus M on the right side of FIG. 13 represents a functional portion for processing an address belonging to a first vlan (the vlan tag is vlan 10). In FIG. 13, out of two horizontal lines extending through the master network transmission apparatus M and the network transmission apparatuses S1, S2, and S3, the upper line indicates the virtual transmission line of the first vlan (the vlan tag is vlan 10), and the lower line indicates the virtual transmission line of the second vlan (the vlan tag is vlan 20).

In this network system, two addresses are given to each of the master network transmission apparatus M and the network transmission apparatuses S1, S2, and S3 (to also be simply referred to as the transmission apparatuses M, S1, S2, and S3 hereinafter). This aims at preventing the same address from being transmitted from different paths in the same vlan in the network system. In each of the master network transmission apparatus M and the network transmission apparatuses S1, S2, and S3, the first frame reception unit 42 and the second frame reception unit 43 use the two addresses.

In each of the transmission apparatuses M, S1, S2, and S3, the frame setting unit 41 sets two transmission frames of the two addresses. Each address information storage unit 45 stores address information about a corresponding one of the transmission apparatuses M, S1, S2, and S3 and a corresponding one of the terminal apparatuses MT, T1, T2, and T3 connected to the transmission apparatus. For example, the address information storage unit 45 stores, as the address information, information representing the correspondence relationship between the two addresses of each of the transmission apparatuses including the local transmission apparatus and the addresses of the terminal apparatuses connected to the transmission apparatuses.

In the example shown in FIG. 13, A1 and B1, A2 and B2, and A3 and B3 placed at the lower portions of the network transmission apparatuses S1, S2, and S3 indicate pairs of addresses assigned to the terminal apparatuses T1, T2, and T3 connected to the network transmission apparatuses S1, S2, and S3, respectively. Additionally, in the example shown in FIG. 13, MA and MB placed at the lower portion of the master network transmission apparatus M indicate a pair of addresses assigned to the terminal apparatus MT connected to the master network transmission apparatus M.

The terminal apparatuses MT, T1, T2, and T3 output transmission frames to be transmitted to other terminal apparatuses to the transmission apparatuses M, S1, S2, and S3 through branch-system transmission lines 6, respectively. In each of the transmission apparatuses M, S1, S2, and S3, the branch-system reception unit 14 receives the transmission frame input from a corresponding one of the terminal apparatuses MT, T1, T2, and T3 and inputs it to the frame setting unit 41. The frame setting unit 41 creates two transmission frames (output frames) by converting the addresses (destination address and transmission source address) in the input transmission frame (input frame) based on the address information stored in the address information storage unit 45.

Note that in the network system according to the fourth embodiment, for the transmission frames (transmission frames to be transmitted to the network transmission apparatuses M, S1, S2, and S3) for other terminal apparatuses sent from the terminal apparatuses MT, T1, T2, and T3, "MT", "T1", "T2", and "T3" (the addresses of the transmission source terminal apparatuses) representing the local terminal apparatuses are set as the transmission source addresses, and "MT", "T1", "T2", and "T3" (the addresses of the destination terminal apparatuses) representing the destination terminal apparatuses are set as the destination addresses.

FIG. 14 is a view showing an example of address information stored in the address information storage unit 45. In the example shown in FIG. 14, the addresses (the destination address and the transmission source address) of each terminal apparatus associated with the vlan tags are set. The frame setting unit 41 discriminates the transmission source address and the destination address corresponding to a vlan tag by referring to the address information as shown in FIG. 14. For example, the frame setting unit 41 of each transmission apparatus can create a first output frame obtained by converting the transmission frame input from the terminal apparatus 5 into a transmission source address and a destination address corresponding to vlan 10 and a second output frame obtained by converting the transmission frame into a transmission source address and a destination address corresponding to vlan 20 by referring to the address information shown in FIG. 14.

A case will be explained here in which a transmission frame is transmitted from the terminal apparatus T1 connected to the network transmission apparatus S1 to the terminal apparatus T3 connected to the network transmission apparatus S3.

Figure 15:
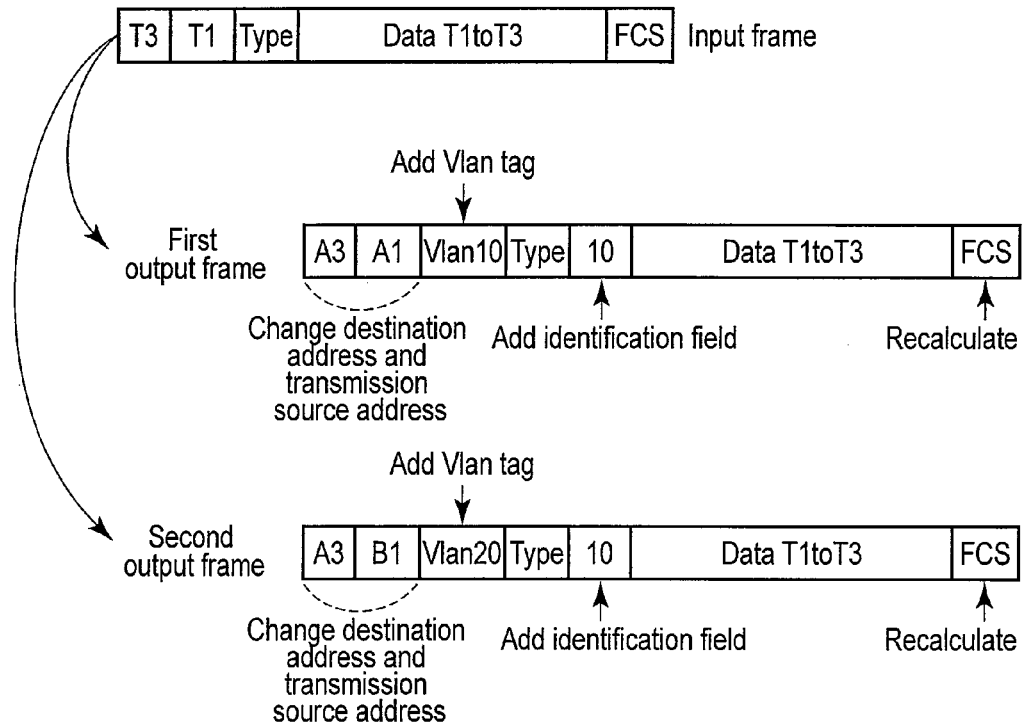
FIG. 15 is a view showing an example of creation of output frames by a frame setting unit according to the fourth embodiment.

FIG. 15 is a view showing an example of two output frames (first and second output frames) created from one input frame.

The frame setting unit 41 of each transmission apparatus duplicates the transmission frame input from the terminal apparatus through the branch-system transmission line 6 to form two transmission frames. The frame setting unit 41 changes the destination address and the transmission source address of each of the two duplicated transmission frames to create two output frames to which a vlan tag and an identification field are added.

In the example shown in FIG. 15, a transmission frame in which the transmission source is the terminal apparatus T1, and the destination is the terminal apparatus T3 is input as the input frame. The first output frame is created by setting the vlan tag to "vlan 10", and the second output frame is created by setting the vlan tag to "vlan 20". Note that the example shown in FIG. 15 assumes that the two output frames are created by referring to the address information shown in FIG. 14. The frame setting unit 41 outputs the two created output frames to the path switching unit 12. The path switching unit 12 transmits the first output frame by vlan 10 and the second output frame by vlan 20.

Assume that vlan 10 and vlan 20 are set as the virtual transmission lines, vlan 10 transmits a transmission frame counterclockwise, and vlan 20 transmits a transmission frame clockwise through the ring-type network. In vlan 10, the addresses of the master network transmission apparatus M and the three network transmission apparatuses S1, S2, and S3 are set as MA, A1, A2, and A3, respectively. In vlan 20, the addresses of the master network transmission apparatus M and the three network transmission apparatuses S1, S2, and S3 are set as MB, B1, B2, and B3, respectively.

Assume that under these settings, the network transmission apparatus S1 receives, from the terminal apparatus T1, a transmission frame (the input frame shown in FIG. 15) whose destination is the terminal apparatus T3. In this case, the frame setting unit 41 creates the first output frame by adding the vlan tag "vlan 10" to the input frame and changing the destination address to "A3" and the transmission source address to "A1", and also creates the second output frame by adding the vlan tag "vlan 20" to the input frame and changing the destination address to "A3" and the transmission source address to "B1".

That is, the frame setting unit 41 of the network transmission apparatus S1 duplicates the transmission frame (input frame) input from the terminal apparatus T1 through the branch-system transmission line 6 to form two transmission frames. For one of the two duplicated transmission frames, the frame setting unit 41 of the network transmission apparatus S1 changes the destination address "T3" to the address "A3" of the terminal apparatus T3 corresponding to vlan 10 and the transmission source address "T1" to the address "A1" of the terminal apparatus T1 corresponding to vlan 10.

For the other of the two duplicated transmission frames, the frame setting unit 41 changes the destination address "T3" to the address "A3" of the terminal apparatus T3 corresponding to vlan 20 and the transmission source address "T1" to the address "B1" of the terminal apparatus T1 corresponding to vlan 20.

The vlan tag "vlan 10" is added to the transmission frame having the transmission source address "A1", and the vlan tag "vlan 20" is added to the transmission frame having the transmission source address "S1". In addition, the same value is set in the identification fields of the two transmission frames to create the first and second output frames. The two output frames are output to the trunk-system transmission line 3 by the path switching unit 12 of the network transmission apparatus S1.

The first output frame having the vlan tag "vlan 10" is transmitted from the network transmission apparatus S1 counterclockwise through the first vlan (vlan 10) and arrives at the network transmission apparatus S3 via the network transmission apparatus S2. The network transmission apparatus S3 causes the first frame reception unit 42 to receive the first output frame. The terminal apparatus T3 having the address "A3" is connected to the network transmission apparatus S3. Hence, the network transmission apparatus S3 causes the frame selection unit 44 to sort whether to select the received first output frame. To select the frame, the frame selection unit 44 outputs the transmission frame to the terminal apparatus T3 of address "A3". Note that the frame selection method will be described later.

The second output frame having the vlan tag "vlan 20" is transmitted from the network transmission apparatus S1 clockwise through the second vlan (vlan 20) and arrives at the master network transmission apparatus M. In the master network transmission apparatus M, the received transmission frame is input to the frame conversion unit 46. The frame conversion unit 46 changes the vlan tag of the received transmission frame.

Figure 16:
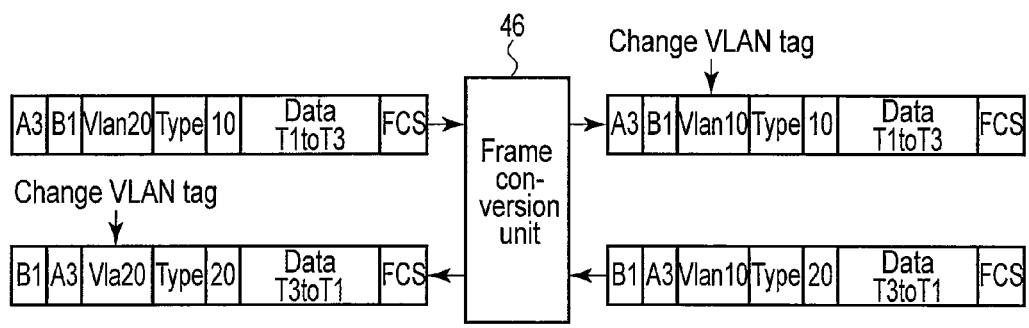
FIG. 16 is a view showing the relationship between input transmission frames and output frames in a frame conversion unit according to the fourth embodiment.

FIG. 16 is a view showing vlan tag conversion (change) processing by the frame conversion unit 46. As shown in FIG. 16, for the transmission frame having the vlan tag "vlan 20", the frame conversion unit 46 changes the vlan tag to "vlan 10". The transmission frame having the vlan tag changed to "vlan 10" is transmitted through the first vlan formed from the virtual transmission line 3a serving as the counterclockwise transmission line, arrives at the network transmission apparatus S3, and is received by the terminal apparatus T3 having the address "A3".

With this mechanism, the first output frame and the second output frame can arrive at the network transmission apparatus S3 and can be output to the terminal apparatus T3 having the address "A3" and connected to the network transmission apparatus S3. The first output frame and the second output frame are transmission frames storing data of the same contents and having the same value in the identification fields. The network transmission apparatus S3 receives the two transmission frames (first and second output frames) of the same contents and causes the frame selection unit 44 to select the transmission frame to be actually output to the terminal apparatus.

A transmission frame selection method of the frame selection unit 44 will be described next.

The frame selection unit 44 selects or discards a received transmission frame based on the value of the identification field of the received transmission frame. As the transmission frame selection method, the frame selection methods as described in the third embodiment are usable. For example, the value of the identification field of a transmission frame is set to a value that increments or decrements by a value in accordance with a predetermined rule for each transmission frame to be sequentially output. In this case, the frame selection unit 44 can discard a transmission frame of the same contents or select continuous transmission frames based on the value of the identification field.

For example, as the first transmission frame selection method, the frame selection unit 44 can use a method of calculating (predicting) the value of the identification field to be received next from the value of the identification field of a previously selected transmission frame, selecting a transmission frame having an identification field value equal to the calculated value, and discarding the remaining transmission frames. Alternatively, as the second transmission frame selection method, the frame selection unit 44 may use a method of discarding a transmission frame whose identification field has the same value as in a selected transmission frame and selecting a transmission frame having a different value in the identification field. Note that as the above-described first and second transmission frame selection methods, the first and second transmission frame selection methods described in the third embodiment are applicable.

Processing of causing the network transmission apparatus to create a transmission frame to be output to a terminal apparatus will be described next.

Figures 17, 18:
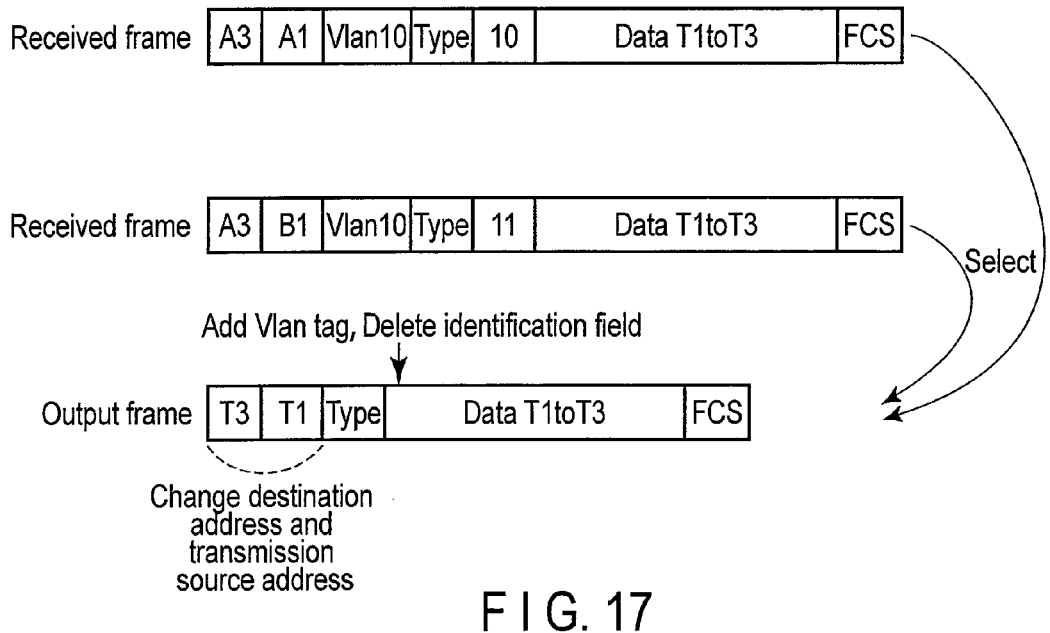
FIG. 17 is a view showing an example of processing of causing the network transmission apparatus according to the fourth embodiment to output a transmission frame to a terminal apparatus.
FIG. 18 is a view showing another example of the address information according to the fourth embodiment.

FIG. 17 is a view for explaining processing of creating, from a selected transmission frame, an output frame to be output to the terminal apparatus.

As shown in FIG. 17, the frame selection unit 44 converts a transmission frame judged to be output to the terminal apparatus into an output frame to the terminal apparatus. That is, the frame selection unit 44 changes the destination address of the selected transmission frame into the address "T3" of the terminal apparatus T3 connected to the branch-system transmission line 6 and the transmission source address into the address "T1" of the terminal apparatus T1 of the transmission source. The frame selection unit 44 also deletes the vlan tag and the identification field of the selected transmission frame to create the output frame to the terminal apparatus. The frame selection unit 44 outputs the transmission frame whose destination address and transmission source address have been changed and whose vlan tag and identification field have been deleted to the terminal apparatus via the branch-system transmission unit 13.

An example of a method of creating the address information to be stored in the address information storage unit 45 will be described next.

The address information as shown in FIG. 14 can be created in the following way in consideration of the correspondence relationship of the addresses.

First, for the terminal apparatus T1 connected to the network transmission apparatus S1 at the left end, the address correspondence relationship with the terminal apparatuses MT, T2, and T3 connected to the other transmission apparatuses M, S2, and S3 corresponding to the clockwise vlan is created, and the address correspondence relationship with the terminal apparatuses MT, T2, and T3 connected to the other transmission apparatuses M, S2, and S3 corresponding to the counterclockwise vlan is created.

Next, for the terminal apparatus T2 connected to the network transmission apparatus S2 adjacent on the right side of the network transmission apparatus S1, concerning the network transmission apparatuses M and S3 other than the network transmission apparatus S1, the address correspondence relationship with the terminal apparatuses MT and T3 connected to the other transmission apparatuses M and S3 corresponding to the clockwise vlan is created, and the address correspondence relationship with the terminal apparatuses MT and T3 connected to the other transmission apparatuses M and S3 corresponding to the counterclockwise vlan is created. This is because the correspondence relationship between the network transmission apparatus S2 and the network transmission apparatus S1 is already created.

For the terminal apparatus T3 connected to the network transmission apparatus S3 adjacent on the right side of the network transmission apparatus S2, concerning the network transmission apparatus M other than the network transmission apparatuses S1 and S2, the address correspondence relationship with the terminal apparatus MT connected to the other transmission apparatus M corresponding to the clockwise vlan is created, and the address correspondence relationship with the terminal apparatus MT connected to the other transmission apparatus M corresponding to the counterclockwise vlan is created. This is because the correspondence relationship between the network transmission apparatus S3 and the network transmission apparatus S1 and the correspondence relationship between the network transmission apparatus S3 and the network transmission apparatus S2 are already created.

For the terminal apparatus MT connected to the master network transmission apparatus M, the addresses of the respective terminal apparatuses are individually associated for each vlan. In this way, the address information representing the address correspondence relationship of the terminal apparatuses for each vlan in the network system can be created.

Note that FIG. 18 is a view showing an example of address information representing the correspondence relationship of various kinds of addresses when n terminal apparatuses are connected to each network transmission apparatus S. As shown in FIG. 18, transmission source addresses and destination addresses corresponding to two vlans can be set even for each of an arbitrary number of terminal apparatuses connected to an arbitrary number of network transmission apparatuses.

As described above, in the network system according to the fourth embodiment, the first vlan formed by the virtual transmission line that transmits a transmission frame only one round counterclockwise from the master network transmission apparatus M and the second vlan formed by the virtual transmission line that transmits a transmission frame only one round clockwise from the master network transmission apparatus M are set. Each network transmission apparatus has two addresses corresponding to the two vlans. The master network transmission apparatus M exchanges the vlan tag of the first vlan and the vlan tag of the second vlan in a transmission frame between the unblocked interfaces of the two virtual transmission lines.

This allows the master network transmission apparatus M to connect the unblocked interfaces of the virtual transmission lines of two ring-type networks and transmit transmission frames through the two virtual transmission lines. It is therefore possible to, in the entire network system, ensure the counterclockwise transmission line and the clockwise transmission line between any network transmission apparatuses S other than the master network transmission apparatus, and implement transmission without loss of data even in the case of a failure.

The fifth embodiment will be described next.

FIG. 19 is a block diagram showing an arrangement example of a master network transmission apparatus M according to the fifth embodiment. FIG. 20 is a block diagram showing an arrangement example of a network transmission apparatus S according to the fifth embodiment. However, an overall network system according to the fifth embodiment can have the same arrangement as that of the network system according to, for example, the fourth embodiment shown in FIG. 10.

As shown in FIG. 19, the master network transmission apparatus M includes a control unit 10, a storage unit 11, a path switching unit 12, a branch-system transmission unit 13, a branch-system reception unit 14, a first trunk-system reception unit 16a, a second trunk-system reception unit 16b, a first trunk-system transmission unit 15a, a second trunk-system transmission unit 15b, a frame setting unit 51, a frame selection unit 52, an address information storage unit 53, and a frame conversion unit 56. The control unit 10, the storage unit 11, the path switching unit 12, the branch-system transmission unit 13, the branch-system reception unit 14, the first trunk-system reception unit 16a, the second trunk-system reception unit 16b, the first trunk-system transmission unit 15a, and the second trunk-system transmission unit 15b can be implemented by the same arrangement as in FIG. 1.

As shown in FIG. 20, the network transmission apparatus S includes the control unit 10, the storage unit 11, the path switching unit 12, the branch-system transmission unit 13, the branch-system reception unit 14, the first trunk-system reception unit 16a, the second trunk-system reception unit 16b, the first trunk-system transmission unit 15a, the second trunk-system transmission unit 15b, the frame setting unit 51, the frame selection unit 52, and the address information storage unit 53. The network transmission apparatus S can be implemented by the same arrangement as that of the master network transmission apparatus M except that the frame conversion unit 56 is omitted, and the path switching unit 12 has no blocking ports 4a and 4b.

The frame setting unit 51 sets a transmission frame input from a terminal apparatus and to be transmitted to another terminal apparatus. The frame setting unit 51 duplicates the transmission frame input from the terminal apparatus and partially changes it, thereby creating an output frame for each vlan. The frame selection unit 52 determines whether to select a received transmission frame. The frame selection unit 52 sorts whether to output a transmission frame whose destination is the terminal apparatus connected to the network transmission apparatus to the destination terminal apparatus or discard it. The address information storage unit 53 stores address information representing the destination address and the transmission source address of each terminal apparatus in the network system. The address information storage unit 53 stores address information representing the destination address and the transmission source address of each terminal apparatus associated with each vlan.

The frame conversion unit 56 included in the master network transmission apparatus M converts an input transmission frame. The frame conversion unit 56 performs conversion processing of connecting unblocked ports and ensuring a path to transmit a transmission frame between virtual transmission lines. For example, the frame conversion unit 56 has an input/output port corresponding to each vlan. The input/output ports are assigned addresses (for example, "M1" and "M2") corresponding to the vlans. The frame conversion unit 56 includes a conversion unit that performs conversion processing for a transmission frame whose destination is the address assigned to an input/output port. The frame conversion unit 56 exchanges the vlan tag in the transmission frame and replaces the transmission source address and the destination address.

Note that in the master network transmission apparatus M or the network transmission apparatus S, each of the branch-system transmission unit 13, the branch-system reception unit 14, the frame setting unit 51, the frame selection unit 52, and the address information storage unit 53 may include a plurality of units.

As described above, in the network system according to the fifth embodiment, to ensure two transmission paths even between the network transmission apparatuses, the frame conversion unit 56 of the master network transmission apparatus M performs conversion processing of connecting unblocked ports and ensuring a path to transmit a transmission frame between the virtual transmission lines.

An example of frame transmission control of the network system according to the fifth embodiment will be described below.

Figures 21, 22:
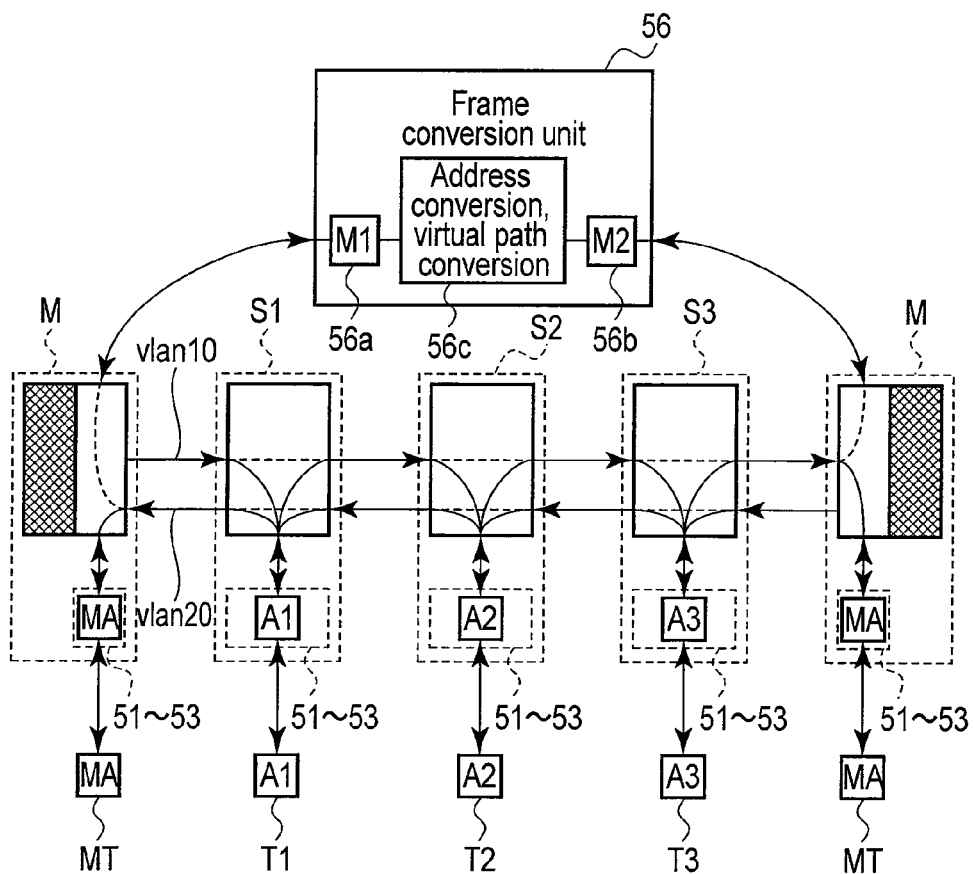
FIG. 21 is a view for explaining the procedure of transmission of transmission frames in the network system according to the fifth embodiment.
FIG. 22 is a view showing an example of address information according to the fifth embodiment.

FIG. 21 is a view conceptually illustrating the input/output relationship of transmission frames transmitted among the master network transmission apparatus M and network transmission apparatuses S1, S2, and S3 as an example of the network system according to the fifth embodiment.

FIG. 21 illustrates the master network transmission apparatus M as two functionally divided blocks. The master network transmission apparatus M on the left side of FIG. 21 represents a functional portion for processing an address belonging to a second vlan (the vlan tag is vlan 20). The master network transmission apparatus M on the right side of FIG. 21 represents a functional portion for processing an address belonging to a first vlan (the vlan tag is vlan 10).

In the network system shown in FIG. 21, the first vlan (the vlan tag is vlan 10) and the second vlan (the vlan tag is vlan 20) formed by two virtual transmission lines are set. The first vlan (vlan 10) is formed by a virtual transmission line that makes one round through the ring-type network counterclockwise from the master network transmission apparatus M. The second vlan (vlan 20) is formed by a virtual transmission line that makes one round through the ring-type network clockwise from the master network transmission apparatus M. In FIG. 21, out of two horizontal lines extending through the master network transmission apparatus M and the network transmission apparatuses S1, S2, and S3, the upper line indicates the virtual transmission line of the first vlan (the vlan tag is vlan 10), and the lower line indicates the virtual transmission line of the second vlan (the vlan tag is vlan 20).

In the example shown in FIG. 21, a terminal apparatus MT is connected to the master network transmission apparatus M as a terminal apparatus 5. Terminal apparatuses T1, T2, and T3 are connected to the network transmission apparatuses S1, S2, and S3 as the terminal apparatuses 5, respectively. The address of the terminal apparatus MT connected to the master network transmission apparatus M is set to "MA". The addresses of the terminal apparatuses T1, T2, and T3 connected to the network transmission apparatuses S1, S2, and S3 are set to "A1", "A2", and "A3", respectively. The address information of the terminal apparatuses is stored in the address information storage unit 53. In this way, each of the terminal apparatuses connected to the master network transmission apparatus M and the network transmission apparatuses S1, S2, and S3 is given one address.

In this network system, two addresses ("M1" and "M2") are set even for the frame conversion unit 56 of the master network transmission apparatus M as well as the terminal apparatuses. These addresses correspond to the respective vlans. In the example shown in FIG. 21, an input/output port 56a assigned the address "M1" and an input/output port 56b assigned the address "M2" are set in the frame conversion unit 56 of the master network transmission apparatus M. The frame conversion unit 56 of the master network transmission apparatus M includes a conversion unit 56c that performs conversion processing to a transmission frame. The conversion unit 56c of the frame conversion unit 56 performs conversion processing for a transmission frame input from one input/output port and outputs it from the other input/output port.

FIG. 22 is a view showing an example of address information stored in the address information storage unit 53. In the example shown in FIG. 22, the addresses (destination addresses and transmission source addresses) of the terminal apparatuses associated with each vlan (each vlan tag) are set.

The frame setting unit 51 of each of the network transmission apparatuses S1, S2, and S3 refers to the address information stored in the address information storage unit 53 and creates two output frames from a transmission frame input from a branch-system transmission line 6.

The frame setting unit 51 refers to address information as shown in FIG. 22 and sets the destination address and the transmission source address of the output frame to be output to each vlan. For example, referring to the address information shown in FIG. 22 allows the frame setting unit 51 to set the destination address and the transmission source address of a transmission frame created from a transmission frame input from the terminal apparatus and to be output to the first vlan (vlan 10) and also set the destination address and the transmission source address of an output frame to be output to the second vlan (vlan 20).

A case in which a transmission frame is transmitted from the terminal apparatus T1 connected to the network transmission apparatus S1 to the terminal apparatus T3 connected to the network transmission apparatus S3 will be explained here.

Figure 23:
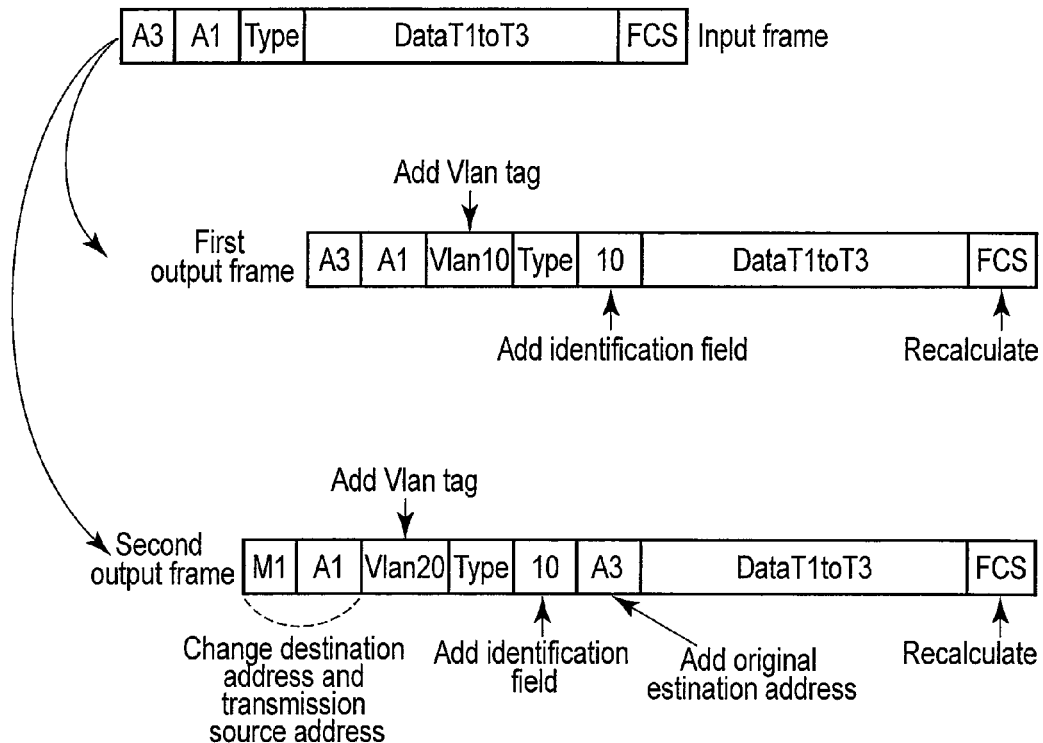
FIG. 23 is a view showing an example of creation of output frames by a frame setting unit according to the fifth embodiment.

FIG. 23 is a view showing an example of two transmission frames (first and second output frames) created by the network transmission apparatus S1 from a transmission frame (input frame) input from the terminal apparatus T1.

The frame setting unit 51 of the network transmission apparatus S1 duplicates the transmission frame input from the terminal apparatus T1 through the branch-system transmission line 6 to form two transmission frames. The frame setting unit 51 creates first and second output frames to be output to the two vlans from the two duplicated transmission frames. FIG. 23 illustrates an example in which the first output frame having a vlan tag "vlan 10" and the second output frame having a vlan tag "vlan 20" are created from the input frame in which the transmission source is the terminal apparatus T1, and the destination is the terminal apparatus T3. The frame setting unit 51 outputs the two created output frames to the path switching unit 12. The path switching unit 12 transmits the first output frame through the vlan 10 and the second output frame through the vlan 20.

The example shown in FIG. 23 assumes that the two output frames are created by referring to the address information shown in FIG. 22.

The frame setting unit 51 creates the first output frame by adding "vlan 10" as the vlan tag and adding a value "10" to the identification field without changing the destination address ("A3") and the transmission source address ("A1") of the input frame. Note that for the first output frame, the FCS is recalculated and updated to the recalculated value. The path switching unit 12 of the network transmission apparatus S1 outputs the first output frame to the first vlan of a trunk-system transmission line 3.

For the second output frame, the frame setting unit 51 changes the destination address of the input frame from "A3" to "M1" while maintaining the transmission source address as "A1", adds "vlan 20" as the vlan tag, and adds the same value "10" as in the identification field of the first output frame to the identification field. In addition, the frame setting unit 51 adds the original destination address "A3" at the end of the identification field (which can also be regarded as the start of the data portion) in the frame in which the destination address of the input frame is changed from "A3" to "M1", thereby creating the second output frame. Note that for the second output frame as well, the FCS is recalculated and updated to the recalculated value. The path switching unit 12 of the network transmission apparatus S1 outputs the second output frame to the second vlan of the trunk-system transmission line 3.

The first output frame having the vlan tag "vlan 10" is transmitted from the network transmission apparatus S1 counterclockwise through the first vlan (vlan 10) and arrives at the network transmission apparatus S3 via the network transmission apparatus S2. The network transmission apparatus S3 causes the first frame reception unit 42 to receive the first output frame. The terminal apparatus T3 having the address "A3" is connected to the network transmission apparatus S3. Hence, the network transmission apparatus S3 causes the frame selection unit 52 to decide whether to select the received first output frame. To select the first output frame, the frame selection unit 52 converts the frame into a transmission frame to be output to the terminal apparatus and outputs it to the terminal apparatus T3 having the address "A3". Note that the frame selection method will be described later.

The second output frame having the vlan tag "vlan 20" is transmitted from the network transmission apparatus S1 clockwise through the second vlan (vlan 20) and arrives at the master network transmission apparatus M. In the master network transmission apparatus M, the received transmission frame having the destination address "M1" is input from the input/output port 56a of the frame conversion unit 56, to which the address "M1" is assigned. The frame conversion unit 56 changes the vlan tag and the destination address of the input transmission frame (second output frame).

Figure 24:
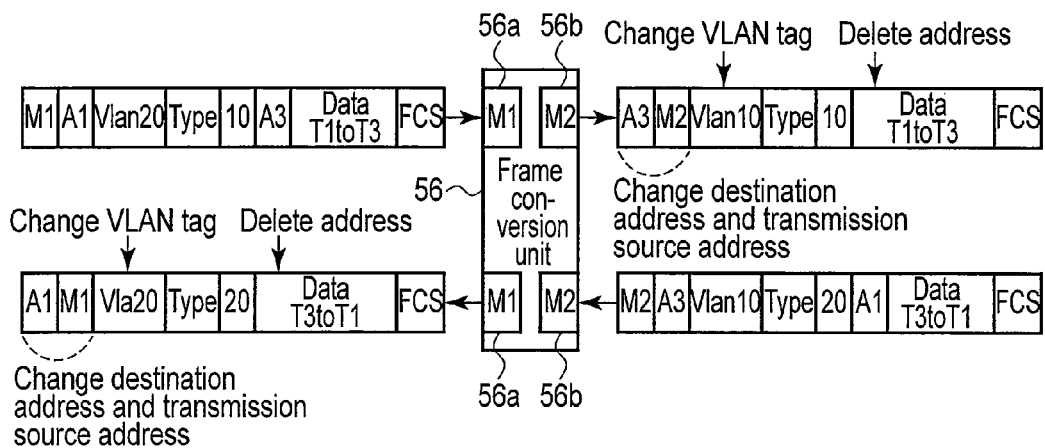
FIG. 24 is a view showing the relationship between input transmission frames and output frames in a frame conversion unit according to the fifth embodiment.

FIG. 24 is a view showing frame conversion (change) processing by the frame conversion unit 56. As shown in FIG. 24, the frame conversion unit 56 includes the input/output ports 56a and 56b corresponding to the respective vlans. In the example shown in FIG. 24, the input/output port 56a is given "M1" as the destination address from another apparatus. For this reason, the input/output port 56a inputs a transmission frame having the destination address "M1" out of transmission frames input to the master network transmission apparatus M. The input/output port 56*b* is assigned "M2" as the transmission source address. For this reason, the input/output port 56*b* outputs a transmission frame whose transmission source address after the frame conversion processing by the conversion unit 56*c* is "M2".

Note that the input/output port 56*b* is assigned "M2" as the destination address from another apparatus. For this reason, the input/output port 56*b* inputs a transmission frame having the destination address "M2" out of transmission frames input to the master network transmission apparatus M. In addition, the input/output port 56*a* outputs a transmission frame whose transmission source address after the frame conversion processing by the conversion unit 56*c* is "M1".

As shown in FIG. 24, for the transmission frame having the vlan tag "vlan 20", the frame conversion unit 56 changes the vlan tag to "vlan 10". The frame conversion unit 56 changes the destination address "M1" to the address "A3" set at the end of the identification field (the start of the data portion). "A3" set at the end of the identification field (the start of the data portion) is deleted. The frame conversion unit 56 also changes the transmission source address from "A1" to "M2".

That is, for the transmission frame having the destination address "M1", the transmission source address "A1", the vlan tag "vlan 20", and the address information set to "A3" immediately after the identification field, the frame conversion unit 56 changes the destination address to "A3", the transmission source address to "M2", and the vlan tag to "vlan 10", and deletes the address information "A3" immediately after the identification field to create a transmission frame (output frame). The path switching unit 12 of the master network transmission apparatus M transmits the output frame through the first vlan (vlan 10) of the trunk-system transmission line.

That is, for the transmission frame having the destination address "M1" (or "M2"), the frame conversion unit changes the vlan tag, the destination address to the initial destination address stored immediately after the identification field, and the transmission source address to the address "M2" (or "M1") of the output portion of the frame conversion unit, and then outputs the transmission frame. Hence, the transmission frame after the conversion by the frame conversion unit 56 of the master network transmission apparatus M is transmitted through a vlan different from that at the time of reception and arrives at the network transmission apparatus connected to the terminal apparatus of the initial destination.

A transmission frame selection method of the frame selection unit 52 will be described next.

Two output frames transmitted from a given network transmission apparatus are transmitted to the network transmission apparatus connected to the destination terminal apparatus through the vlans, as described above. In the network transmission apparatus, every time the transmission frame for the terminal apparatus connected to the network transmission apparatus is received, the frame selection unit 52 judges whether to select the received transmission frame or discard it.

As the transmission frame selection method of the frame selection unit 52, the frame selection methods described in the third embodiment are applicable. For example, the value of the identification field of a transmission frame is set to a value that increments or decrements by a value in accordance with a predetermined rule for each transmission frame to be sequentially output. In this case, the frame selection unit 52 can discard a transmission frame of the same contents or select continuous transmission frames based on the value of the identification field.

As the first transmission frame selection method, the frame selection unit 52 can use a method of calculating (predicting) the value of the identification field to be received next from the value of the identification field of a previously selected transmission frame, selecting a transmission frame having an identification field value equal to the calculated value, and discarding the remaining transmission frames. Alternatively, as the second transmission frame selection method, the frame selection unit 52 may use a method of discarding a transmission frame whose identification field has the same value as in a selected transmission frame and selecting a transmission frame having a different value in the identification field.

An example of a method of creating the address information to be stored in the address information storage unit 53 will be described next.

The address information as shown in FIG. 22 can be created in the following way in consideration of the correspondence relationship of the addresses.

First, one address is set for each terminal apparatus, and the transmission source address of each terminal apparatus is set. For the terminal apparatus MT connected to the master network transmission apparatus M, the addresses of the terminal apparatuses are directly set for both the first vlan (vlan 10) and the second vlan (vlan 20).

The destination address of each terminal apparatus having the vlan tag "vlan 10" is set based on whether the transmission order is before or after that of the master network transmission apparatus M. For a terminal apparatus connected to a network transmission apparatus, whose order of transmission through the vlan 10 from the network transmission apparatus connected to the terminal apparatus of the transmission source is before that of the master network transmission apparatus M, the destination address assigned to the terminal apparatus is set. For a terminal apparatus whose order of transmission through the vlan 10 is after that of the master network transmission apparatus M, the destination address is set to "M2".

The destination address of each terminal apparatus having the vlan tag "vlan 20" is also set based on whether the transmission order is before or after that of the master network transmission apparatus M. For a terminal apparatus connected to a network transmission apparatus, whose order of transmission through the vlan 20 from the network transmission apparatus connected to the terminal apparatus of the transmission source is before that of the master network transmission apparatus M, the destination address assigned to the terminal apparatus is set. For a terminal apparatus whose order of transmission through the vlan 20 is after that of the master network transmission apparatus M, the destination address is set to "M1".

For example, assume that the destination address is set sequentially from the terminal apparatus T1 connected to the network transmission apparatus S1 at the left end in FIG. 21. In this case, for example, for the terminal apparatus T1 connected to the network transmission apparatus S1 at the left end, the destination addresses of the terminal apparatuses T2 and T3 on the vlan 10 are set to "A2" and "A3", respectively. In addition, for the terminal apparatus T1 connected to the network transmission apparatus S1 at the left end, the destination addresses of the terminal apparatuses T2 and T3 on the vlan 20 are set to "M1.

Next, for the terminal apparatus T2 connected to the network transmission apparatus S2 adjacent on the right side, the address of each terminal apparatus on the vlan 10 is directly set as the destination address. In addition, for the terminal apparatus T2 connected to the network transmission apparatus S2, as the destination address of each terminal apparatus on the vlan 20, the destination address of the terminal apparatus T3 connected to the network transmission apparatus S3 other than the network transmission apparatus S1 is set to "M1". For the terminal apparatus T1 of the network transmission apparatus S1, the address "M2" assigned to the input portion of the vlan 10 of the frame conversion unit 56 is set only for the vlan 10 as the destination address "A1" previously set.

Note that FIG. 25 is a view showing an example of address information representing the address correspondence relationship when the number of network transmission apparatuses is n. As shown in FIG. 25, the address information can be set using the above-described method even when an arbitrary number of network transmission apparatuses are used.

In other words, for the virtual transmission line (for example, vlan 10) that makes one round through the ring-type network counterclockwise from the master network transmission apparatus, the destination address of each terminal apparatus connected to a network transmission apparatus before the master network transmission apparatus counterclockwise when viewed from the network transmission apparatus connected to the terminal apparatus of the transmission source is set to the address assigned to the terminal apparatus.

For the virtual transmission line (for example, vlan 20) that makes one round through the network clockwise from the master network transmission apparatus, the destination address of each terminal apparatus connected to a network transmission apparatus after the master network transmission apparatus clockwise when viewed from the network transmission apparatus connected to the terminal apparatus of the transmission source is set to the address (for example, M1) assigned to the input portion of the virtual transmission line in the frame conversion unit of the master network transmission apparatus.

For the virtual transmission line (for example, vlan 10) that makes one round through the ring-type network counterclockwise from the master network transmission apparatus, the destination address of each terminal apparatus connected to a network transmission apparatus after the master network transmission apparatus clockwise when viewed from the network transmission apparatus is set to the address assigned to the terminal apparatus and the address (for example, "M2") assigned to the input portion of the virtual transmission line in the frame conversion unit of the master network transmission apparatus.

As described above, in the network system according to the fifth embodiment, each network transmission apparatus has two addresses corresponding to the two virtual transmission lines for frame conversion in the master network transmission apparatus. Each terminal apparatus has one address. For a transmission frame whose destination address is the address assigned for frame conversion, the master network transmission apparatus exchanges the vlan tag, and replaces the destination address with the address of the terminal apparatus of the actual destination and the transmission source address with the address assigned to the frame conversion unit.

Hence, according to the network system of the fifth embodiment, it is possible to ensure two transmission paths between the network transmission apparatuses and perform transmission while reducing loss of data transmitted/received between the network transmission apparatuses even in the case of a failure.

The sixth embodiment will be described next.

The sixth embodiment is a modification of the fifth embodiment. For this reason, a network system according to the sixth embodiment is assumed to have the same arrangement as that of the network system described in the fifth embodiment. In the network system of the above-described fifth embodiment, to cause the frame conversion unit to perform address conversion, the address value of a terminal apparatus representing the actual destination is transmitted by providing another field.

In the network system according to the sixth embodiment, however, to save the labor in the address replacement operation of the frame conversion unit, the arrangement of an output frame to be created by each network transmission apparatus from an input frame is changed. In addition, conversion processing to be executed by the master network transmission apparatus for a received transmission frame (output frame) is also changed.

Figure 26:
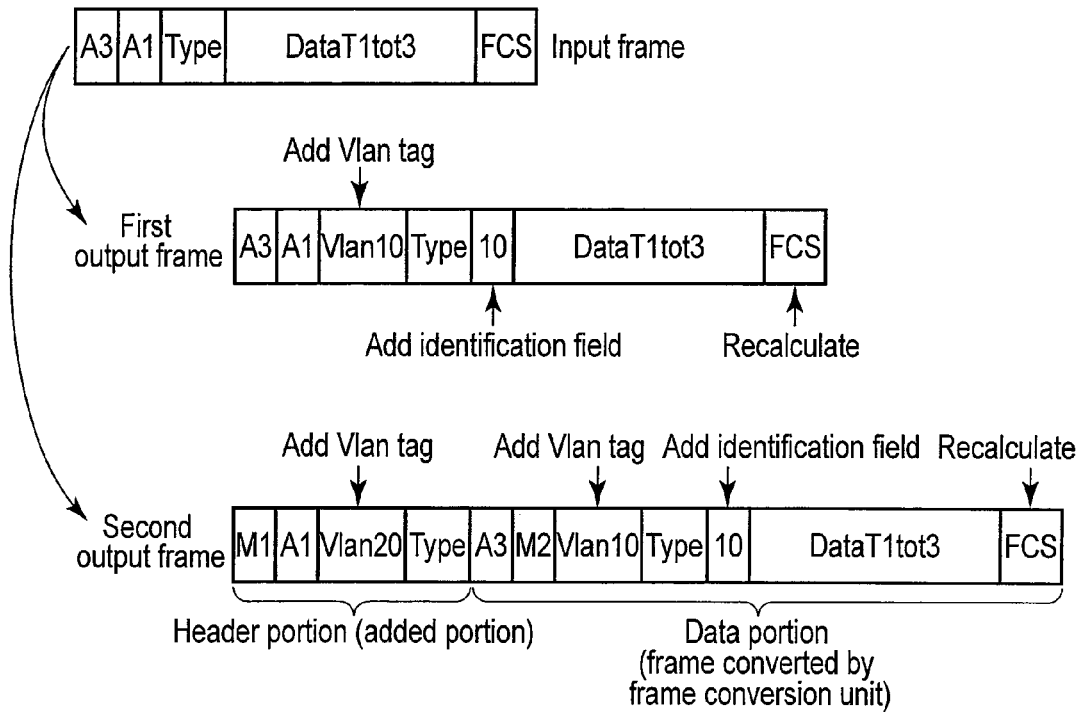
FIG. 26 is a view showing an example of creation of output frames by a frame setting unit according to the sixth embodiment.

FIG. 26 is a view showing an arrangement example of output frames created from an input frame by each network transmission apparatus in the network system according to the sixth embodiment.

In the example shown in FIG. 26, the input frame is the transmission frame from a terminal apparatus T1 connected to a network transmission apparatus S1 to a terminal apparatus T3 connected to a network transmission apparatus S3. A frame setting unit 51 of the network transmission apparatus S1 creates two output frames from one input frame, as shown in FIG. 26.

The first output frame shown in FIG. 26 is transmitted from the network transmission apparatus S1 to the network transmission apparatus S3 clockwise through a vlan. The first output frame has the same arrangement as that of the first output frame shown in FIG. 23 described in the fifth embodiment.

The second output frame shown in FIG. 26 is transmitted from the network transmission apparatus S1 to the network transmission apparatus S3 via a frame conversion unit 56 of a master network transmission apparatus M. The second output frame shown in FIG. 26 includes a transmission frame to be created (output) by the frame conversion unit 56. The second output frame shown in FIG. 26 also includes a header portion to transmit the transmission frame from the network transmission apparatus S1 to the frame conversion unit 56 of the master network transmission apparatus M.

That is, when the destination of the output frame is the frame conversion unit of the master network transmission apparatus, the frame setting unit 51 of the network transmission apparatus S1 creates a transmission frame (the transmission frame after conversion in the frame conversion unit) to be output from the master network transmission apparatus and adds, to the data (transmission frame), a header portion formed from a destination address ("M1"), a transmission source address ("A1"), a vlan tag ("vlan 20"), and a Type field, thereby creating the output frame (second output frame).

Figure 27:
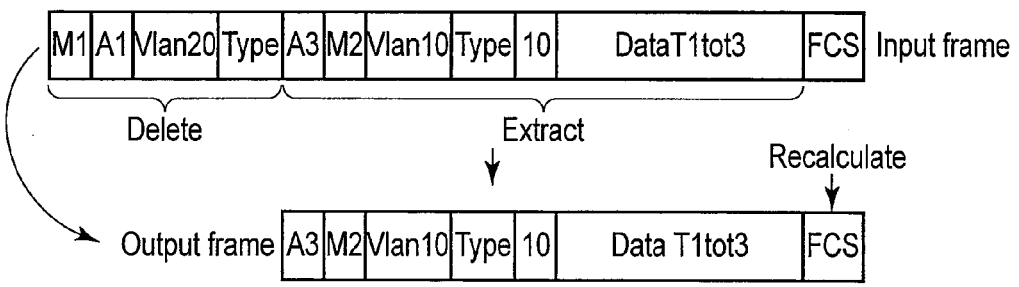
FIG. 27 is a view showing the relationship between input transmission frames and output frames in a frame conversion unit according to the sixth embodiment.

A path switching unit 12 of the network transmission apparatus S1 transmits the second output frame as described above to the master network transmission apparatus M through the vlan 20. In the master network transmission apparatus M, the frame conversion unit 56 receives the second output frame. The frame conversion unit 56 deletes the header portion of the received second output frame and recalculates the FCS, thereby creating a transmission frame (output frame) to be transmitted through the vlan 10, as shown in FIG. 27.

As described above, according to the sixth embodiment, the frame conversion unit 56 of the master network transmission apparatus M can create the output frame only by deleting the header portion and recalculating the FCS (transmission frame check sequence). This allows to reduce the processing the master network transmission apparatus M performs.

Note that in the network system of the sixth embodiment as well, each network transmission apparatus can sort a frame to be output to the terminal apparatus from the received transmission frame using the transmission frame selection method as described in the third or fifth embodiment.

The seventh embodiment will be described next.

FIG. 28 is a block diagram showing an arrangement example of a master network transmission apparatus M according to the seventh embodiment. FIG. 29 is a block diagram showing an arrangement example of a network transmission apparatus S according to the seventh embodiment. However, an overall network system according to the seventh embodiment can have the same arrangement as that of the network system according to, for example, the fourth embodiment shown in FIG. 10.

As shown in FIG. 28, the master network transmission apparatus M includes a control unit 10, a storage unit 11, a path switching unit 12, a branch-system transmission unit 13, a branch-system reception unit 14, a first trunk-system reception unit 16a, a second trunk-system reception unit 16b, a first trunk-system transmission unit 15a, a second trunk-system transmission unit 15b, a frame setting unit 71, a frame selection unit 72, an address information storage unit 73, a frame conversion unit 76, and a second address information storage unit 77. The control unit 10, the storage unit 11, the path switching unit 12, the branch-system transmission unit 13, the branch-system reception unit 14, the first trunk-system reception unit 16a, the second trunk-system reception unit 16b, the first trunk-system transmission unit 15a, and the second trunk-system transmission unit 15b can be implemented by the same arrangement as in FIG. 1.

As shown in FIG. 29, the network transmission apparatus S includes the control unit 10, the storage unit 11, the path switching unit 12, the branch-system transmission unit 13, the branch-system reception unit 14, the first trunk-system reception unit 16a, the second trunk-system reception unit 16b, the first trunk-system transmission unit 15a, the second trunk-system transmission unit 15b, the frame setting unit 71, the frame selection unit 72, and the address information storage unit 73. The network transmission apparatus S can be implemented by the same arrangement as that of the master network transmission apparatus M except that the frame conversion unit 76 and the second address information storage unit 77 are omitted, and the path switching unit 12 has no blocking ports 4a and 4b.

The frame setting unit 71 sets a transmission frame input from a terminal apparatus and to be transmitted to another terminal apparatus. The frame setting unit 71 duplicates the transmission frame input from the terminal apparatus and partially changes it, thereby creating an output frame for each vlan. The frame selection unit 72 determines whether to select a received transmission frame. The frame selection unit 72 decides whether to output a transmission frame whose destination is the terminal apparatus connected to the network transmission apparatus to the terminal apparatus or discard it.

The address information storage unit 73 stores address information representing the destination address, symbol information (destination address symbol) corresponding to the destination address, and the transmission source address of each terminal apparatus in the network system. The address information storage unit 73 stores address information representing the destination address, the destination address symbol, and the transmission source address of each terminal apparatus associated with each vlan.

The second address information storage unit 77 included in the master network transmission apparatus M stores information that associates a destination address with a destination address symbol (conversion information of a destination address and a destination address symbol). The frame conversion unit 76 included in the master network transmission apparatus M refers to the conversion information stored in the second address information storage unit 77 and performs frame conversion for an input transmission frame. As in the arrangement shown in FIG. 24, the frame conversion unit 76 has an input/output port corresponding to each vlan. The input/output ports are assigned addresses (for example, "M1" and "M2").

The frame conversion unit 76 performs conversion processing for a transmission frame whose destination is the address assigned to an input/output port. The frame conversion unit 76 performs conversion processing of connecting unblocked ports and ensuring a path to transmit a transmission frame between the virtual transmission lines. For example, the frame conversion unit 76 exchanges the vlan tag in the transmission frame and replaces the transmission source address and the destination address.

FIG. 30 is a view showing an example of two output frames created from an input frame by each network transmission apparatus in the network system according to the seventh embodiment.

In the example shown in FIG. 30, the input frame is the transmission frame from a terminal apparatus T1 connected to a network transmission apparatus S1 to a terminal apparatus T3 connected to a network transmission apparatus S3. The frame setting unit 71 of the network transmission apparatus S1 creates two output frames from one input frame, as shown in FIG. 30.

The first output frame shown in FIG. 30 is transmitted from the network transmission apparatus S1 to the network transmission apparatus S3 clockwise through a vlan. The first output frame has the same arrangement as that of the first output frame shown in FIG. 23 described in the fifth embodiment.

The second output frame shown in FIG. 30 is transmitted from the network transmission apparatus S1 to the network transmission apparatus S3 via the frame conversion unit 76 of the master network transmission apparatus M. The second output frame shown in FIG. 30 is different from the second output frame shown in FIG. 23 described in the fifth embodiment in the setting of the actual destination address. That is, in the second output frame shown in FIG. 30, not the address of the terminal apparatus of the actual destination itself but a destination address symbol that symbolizes the address of the terminal apparatus is added at the end of the identification field (the start of the data portion).

The destination address symbol that symbolizes the address of each terminal apparatus is stored in the address information storage unit 73 and the second address information storage unit 77 in association with the destination address. For example, the address of each terminal apparatus can be reduced to 6 octets or less by symbolization. If the number of addresses to be assigned (for example, the number of terminal apparatuses) in the network system is 256 or less, each destination address can be symbolized to 1 octet (8 bits).

Figure 31:
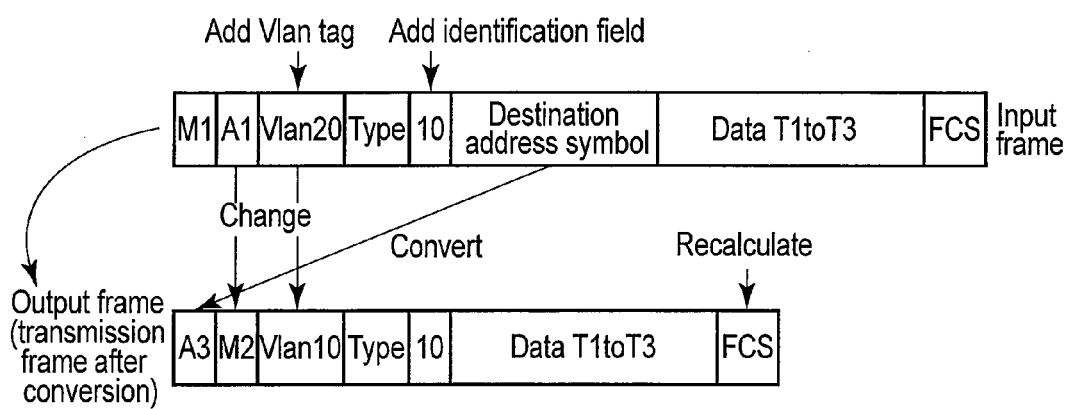
FIG. 31 is a view showing the relationship between input transmission frames and output frames in a frame conversion unit according to the seventh embodiment.

FIG. 31 is a view showing an example of frame conversion processing of the frame conversion unit 76 of the master network transmission apparatus according to the seventh embodiment.

The second output frame shown in FIG. 30 is output from the network transmission apparatus S1 to the master network transmission apparatus M. In the master network transmission apparatus M, the frame conversion unit 76 inputs the second output frame whose destination address is set to "M1". The frame conversion unit 76 converts the input transmission frame into an output frame and outputs it again, as shown in FIG. 31.

More specifically, the frame conversion unit 76 converts the destination address symbol added at the end of the identification field (the start of the data portion) of the received transmission frame into the actual destination address based on the conversion information stored in the second address information storage unit 77. After converting the destination address symbol into the actual destination address, the frame conversion unit 76 rewrites the destination address of the received transmission frame to the destination address converted from the destination address symbol. In addition, the frame conversion unit 76 rewrites the transmission source address of the received transmission frame to "M1" and exchanges the vlan tag (change vlan 20 to vlan 10).

The frame conversion unit 76 also recalculates the FCS of the frame in which the destination address, the transmission source address, and the vlan tag are replaced, and the destination address symbol added at the end of the identification field (the start of the data portion) is deleted, and rewrites the value of the FCS to the recalculated value. The frame conversion unit 76 outputs the frame created by the above-described processing to the path switching unit 12 as an output frame (transmission frame after conversion). The path switching unit 12 outputs the transmission frame after conversion to the virtual transmission line of the trunk-system transmission line in accordance with the vlan tag.

Note that the frame selection unit 72 can use the transmission frame selection method described in the third or fifth embodiment. That is, when the value of the identification field of a transmission frame is set to a value that increments or decrements by a value in accordance with a predetermined rule for each transmission frame to be sequentially output, the frame selection unit 72 can discard a transmission frame of the same contents or select continuous subsequent transmission frames based on the value of the identification field.

For example, the frame selection unit 72 can use the first transmission frame selection method of calculating (predicting) the value of the identification field to be received next from the value of the identification field of a previously selected transmission frame, selecting a transmission frame having an identification field value equal to the calculated value, and discarding the remaining transmission frames. Alternatively, the frame selection unit 72 may use the second transmission frame selection method of discarding a transmission frame whose identification field has the same value as in a selected transmission frame and selecting a transmission frame having a different value in the identification field.

As described above, in the seventh embodiment, a destination address symbol that symbolizes the actual destination address is added to a transmission frame in which the frame conversion unit of the master network transmission apparatus is set to the destination address. This allows to shorten the information representing the actual destination address and also shorten the length of the transmission frame itself. It is therefore possible to decrease the transmission capacity in the network system.

As described above, in the network system described in each embodiment, a plurality of transmission apparatuses are connected by a ring-type network. A first virtual transmission line that transmits data in a first direction through the ring-type network and a second virtual transmission line that transmits data in a second direction opposite to the first direction are set, thereby ensuring two virtual transmission lines. This allows the network system of each embodiment to ensure transmission without loss of data even when a failure has occurred on part of the network transmission line.

Even when changing an existing network system to the above-described network system, the network system described in each embodiment can be introduced at a low cost because the existing transmission line can be duplexed by virtual transmission lines. The frame setting unit, the frame selection unit, the frame reception unit, the address information storage unit, or the frame conversion unit described in each embodiment can be implemented and easily introduced at a low cost by retrofitting a general-purpose device to an existing transmission apparatus.

Each network transmission apparatus decides whether a transmission frame for a terminal apparatus connected through a branch-system transmission line out of received transmission frames is a necessary transmission frame, and outputs only a transmission frame selected as a necessary transmission frame to the terminal apparatus. Since this allows the terminal apparatus connected to the network transmission apparatus to receive only the sorted transmission frame, the processing capability of the terminal apparatus itself need not always be high, and a general-purpose apparatus is applicable as the terminal apparatus.

For example, a railway vehicle is equipped with a terminal device such as a control-system device, for example, a motor or a brake, a monitor-system device for monitoring the state of a device, or a device for controlling the doors. The railway vehicle may also be equipped with a terminal device such as an image sensing device for monitoring in the vehicle or a data communication device as a passenger service. In the railway vehicle, to transmit data between the above-described terminal devices, a network system is constructed in which a control apparatus functioning as a master network transmission apparatus is connected to each terminal apparatus through a network transmission apparatus. The network system described in each of the above-described embodiments need not physically duplex the transmission line and can easily be constructed in the railway vehicle using an existing transmission line. That is, according to each embodiment, it is possible to inexpensively introduce a network system capable of easily duplexing data transmission by two virtual transmission lines using an existing transmission line in a railway vehicle.

The application range of the network system according to the embodiment is not limited to a network system in a railway vehicle, and the network system is applicable to network systems for various purposes constructed as a ring-type network. For example, as an industrial network system that implements automation in a factory, a ring-type network system with little loss of data, which is introducible at a low cost, is demanded. The network system of the embodiment can easily be applied even to the above-described industrial network system at a low cost.

Note that the network system according to each embodiment is a system that connects a master transmission apparatus and a plurality of transmission apparatuses by a ring-type network. The master transmission apparatus includes a first blocking port configured to block a first virtual transmission line that transmits data in the clockwise direction, and a second blocking port configured to block a second virtual transmission line that transmits data in the counterclockwise direction. Each transmission apparatus creates a first transmission frame by adding a first tag representing the first virtual transmission line to a transmission frame input from a connected terminal apparatus, and a second transmission frame by adding a second tag representing the second virtual transmission line to the transmission frame input from the terminal apparatus. Each transmission apparatus transmits the first transmission frame through the first virtual transmission line and the second transmission frame through the second virtual transmission line.

Each transmission apparatus according to the above-described embodiment may add an identification field describing a value that increments or decrements in accordance with a predetermined rule to each transmission frame and output the transmission frame.

The terminal apparatus according to the above-described embodiment may acquire the value of the identification field of a transmission frame received via the transmission apparatus, predict the value of the identification field to be received next by the method of adding the identification field, select a transmission frame whose identification field has a value matching the prediction result out of transmission frames received next, and discard the remaining transmission frames.

The terminal apparatus according to the above-described embodiment may acquire the value of the identification field of a transmission frame received via the transmission apparatus, discard a transmission frame whose identification field has the same value as the value of the identification field out of transmission frames received next, and select another transmission frame.

The transmission apparatus according to the above-described embodiment may acquire the value of the identification field of a received transmission frame, predict the value of the identification field to be received next by the method of adding the identification field, select a transmission frame whose identification field has a value matching the prediction result out of transmission frames received next, and discard the remaining transmission frames.

The transmission apparatus according to the above-described embodiment may acquire the value of the identification field of a received transmission frame, discard a transmission frame whose identification field has the same value as the value of the identification field out of transmission frames received next, and select another transmission frame.

The network system according to the fourth embodiment is a system that connects a master transmission apparatus and a plurality of transmission apparatuses by a ring-type network. Each of the master transmission apparatus and the transmission apparatuses has an address corresponding to a first virtual transmission line and an address corresponding to a second virtual transmission line. Upon receiving a transmission frame to which a first tag representing the first virtual transmission line is added, the master transmission apparatus outputs a transmission frame in which the first tag is changed to a second tag representing the second virtual transmission line. Upon receiving a transmission frame to which the second tag representing the second virtual transmission line is added, the master transmission apparatus outputs a transmission frame in which the second tag is changed to the first tag. Each transmission apparatus creates a first transmission frame by adding the first tag to a transmission frame input from the connected terminal apparatus and changing the destination and transmission source addresses to the address corresponding to the first virtual transmission line, and a second transmission frame by adding the second tag to the transmission frame input from the terminal apparatus and changing the destination and transmission source addresses to the address corresponding to the second virtual transmission line, and outputs the first transmission frame and the second transmission frame. The transmission apparatus also selects or discards, based on the identification field value, a transmission frame having a destination address matching the address of the terminal apparatus connected to the transmission apparatus out of received transmission frames, and outputs the selected transmission frame to the terminal apparatus connected to the transmission apparatus.

The transmission apparatus according to the fourth embodiment includes a storage unit that stores the correspondence relationship between the address of the terminal apparatus connected to the transmission apparatus and the address of the transmission apparatus and the correspondence relationship between the address of the terminal apparatus connected to another transmission apparatus and the address of the other transmission apparatus. The transmission apparatus outputs first and second transmission frames in which the transmission source address and the destination address of a transmission frame input from the terminal apparatus are changed based on the address correspondence relationship stored in the storage unit, and an identification field describing a value that increments or decrements in accordance with a predetermined rule is added.

The transmission apparatus according to the fourth embodiment may acquire the value of the identification field of a transmission frame having a destination address matching the address of the transmission apparatus out of received transmission frames, predict the value of the identification field to be received next by the method of adding the identification field, select a transmission frame whose identification field has a value matching the prediction result out of transmission frames received next and having a destination address matching the address of the network transmission apparatus, and discard the remaining transmission frames.

The transmission apparatus according to the fourth embodiment may acquire the value of the identification field of a transmission frame having a destination address matching the address of the transmission apparatus out of received transmission frames, discard a transmission frame whose identification field has the same value as the value of the identification field out of transmission frames received next and having a destination address matching the address of the network transmission apparatus, and select another transmission frame.

The network system according to the fifth embodiment is a ring-type network including a master transmission apparatus and a plurality of transmission apparatuses. Each of the master transmission apparatus and the transmission apparatuses has an address corresponding to a first virtual transmission line and an address corresponding to a second virtual transmission line. Upon receiving a transmission frame to which a first tag representing the first virtual transmission line is added, for the received transmission frame, the master transmission apparatus changes the first tag to a second tag representing the second virtual transmission line, and changes the transmission source address and the destination address to the address belonging to the second virtual transmission line. Upon receiving a transmission frame to which the second tag is added, for the received transmission frame, the master transmission apparatus changes the second tag to the first tag, and changes the transmission source address and the destination address to the address belonging to the first virtual transmission line. The master transmission apparatus outputs the transmission frame in which the tag is changed to the second tag to the second virtual transmission line, and outputs the transmission frame in which the tag is changed to the first tag to the first virtual transmission line. Each transmission apparatus selects or discards, based on the identification field value, a transmission frame having a destination address matching the address of the terminal apparatus connected to the transmission apparatus out of received transmission frames, and outputs the selected transmission frame to the terminal apparatus connected to the transmission apparatus.

The transmission apparatus according to the fifth embodiment creates a first transmission frame by adding the first tag and an identification field describing a value that increments or decrements in accordance with a predetermined rule to a transmission frame input from the connected terminal apparatus, and a second transmission frame by adding the second tag and an identification field describing a value that increments or decrements in accordance with a predetermined rule to the transmission frame input from the terminal apparatus. The transmission apparatus outputs the first transmission frame to the first virtual transmission line and the second transmission frame to the second virtual transmission line.

The transmission apparatus according to the fifth embodiment may acquire the value of the identification field of a transmission frame having a destination address matching the address of the terminal apparatus connected to the transmission apparatus out of received transmission frames, predict the value of the identification field to be received next by the method of adding the identification field, select a transmission frame whose identification field has a value matching the prediction result out of transmission frames received next, and discard the remaining transmission frames.

The transmission apparatus according to the fifth embodiment may acquire the value of the identification field of a transmission frame having a destination address matching the address of the terminal apparatus connected to the transmission apparatus out of received transmission frames, discard a transmission frame whose identification field has the same value as the value of the identification field out of transmission frames received next, and select another transmission frame.

The network system according to the sixth embodiment is a system that connects a master transmission apparatus and a plurality of transmission apparatuses by a ring-type network. Each of the master transmission apparatus and the transmission apparatuses has an address corresponding to a first virtual transmission line and an address corresponding to a second virtual transmission line. The transmission apparatus duplicates a transmission frame input from a connected terminal apparatus. The transmission apparatus creates a first transmission frame by adding one of a first tag representing the first virtual transmission line and a second tag representing the second virtual transmission line and an identification field describing a value that increments or decrements in accordance with a predetermined rule to one of the duplicated transmission frames. The transmission apparatus creates a second transmission frame by adding one of the first tag and the second tag, which is different from the tag of the first transmission frame and an identification field describing a value that increments or decrements in accordance with a predetermined rule to the other of the duplicated transmission frames and also changing the address of the master transmission apparatus on the virtual transmission line of the tag added to the transmission frame to the destination address. The transmission apparatus creates the data of a header portion including the address of the master transmission apparatus on the virtual transmission line different from that of the tag added to the second transmission frame, the transmission source address of the transmission frame input from the terminal apparatus, and the tag of the virtual transmission line different from that of the tag added to the second transmission frame. The transmission apparatus outputs the first transmission frame and the second transmission frame to which the header portion is added. The transmission apparatus selects or discards, based on the identification field value, a transmission frame having a destination address matching the address of the terminal apparatus connected to the transmission apparatus out of received transmission frames, and outputs the selected transmission frame to the terminal apparatus connected to the transmission apparatus.

The master transmission apparatus according to the sixth embodiment may delete the header portion added to the transmission frame having a destination address matching the address of the master transmission apparatus out of received transmission frames, and output the transmission frame in which the header portion is deleted to a virtual transmission line different from the virtual transmission line through which the transmission frame is received.

The transmission apparatus according to the sixth embodiment may acquire the value of the identification field of a transmission frame having a destination address matching the address of the terminal apparatus connected to the transmission apparatus out of received transmission frames, predict the value of the identification field to be received next by the method of adding the identification field, select a transmission frame whose identification field has a value matching the prediction result out of received transmission frames, and discard the remaining transmission frames.

The transmission apparatus according to the sixth embodiment may acquire the value of the identification field of a transmission frame having a destination address matching the address of the terminal apparatus connected to the transmission apparatus out of received transmission frames, discard a transmission frame whose identification field has the same value as the value of the identification field out of transmission frames received next, and select another transmission frame.

The network system according to the seventh embodiment is a system that connects a master transmission apparatus and a plurality of transmission apparatuses by a ring-type network. Each of the master transmission apparatus and the transmission apparatuses is given an address corresponding to a first virtual transmission line and an address corresponding to a second virtual transmission line, and includes a storage that stores each address and a value that symbolizes the address in correspondence with each other. The transmission apparatus duplicates a transmission frame input from a connected terminal apparatus, and creates a first transmission frame by adding one of a first tag representing the first virtual transmission line and a second tag representing the second virtual transmission line and an identification field describing value that increments or decrements in accordance with a predetermined rule to one of the transmission frames duplicated to transmission frames. The transmission apparatus creates a second transmission frame by adding one of the first tag and the second tag, which is different from the tag of the first transmission frame, an identification field describing value that increments or decrements in accordance with a predetermined rule, and a field in which the destination address of the transmission frame input from the terminal apparatus is changed to a value that symbolizes the address on the virtual transmission line of the tag added to the transmission frame to the other of the transmission frames duplicated to transmission frames and also changing the address of the master transmission apparatus on the virtual transmission line of the added tag to the destination address. The transmission apparatus outputs the first transmission frame and the second transmission frame. The transmission apparatus selects or discards, based on the identification field value, a transmission frame having a destination address matching the address of the terminal apparatus connected to the transmission apparatus out of received transmission frames, and outputs the selected transmission frame to the terminal apparatus connected to the transmission apparatus.

The master transmission apparatus according to the seventh embodiment may output a transmission frame in which the tag representing a virtual transmission line is changed to a tag representing another virtual transmission line, the transmission source address is changed to the address of the master transmission apparatus on the virtual transmission line after the change, the destination address is changed to the address converted from the symbolized value in the field, and the symbolization field is deleted in the received transmission frame.

The transmission apparatus according to the seventh embodiment may acquire the value of the identification field of a received transmission frame having a destination address matching the address of the terminal apparatus connected to the transmission apparatus, predict the value of the identification field to be received next by the method of adding the identification field, select a transmission frame whose identification field has a value matching the prediction result out of transmission frames received next, and discard the remaining transmission frames.

The transmission apparatus according to the seventh embodiment may acquire the value of the field of a transmission frame received from a virtual transmission line and having a destination address matching the address of the terminal apparatus connected to the transmission apparatus, discard a transmission frame whose field has the same value as the value of the field out of transmission frames received next, and select another transmission frame.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A network system comprising:
   a master transmission apparatus;
   a plurality of transmission apparatuses; and
   a ring-type network in which a first virtual transmission line that transmits, in a first direction, a transmission frame to be transmitted and received between the master transmission apparatus and the plurality of transmission apparatuses and a second virtual transmission line that transmits the transmission frame in a second direction different from the first direction are formed;
   wherein the master transmission apparatus includes:
      a first blocking port configured to prohibit relay of the transmission frame received through the first virtual transmission line;
      a second blocking port configured to prohibit relay of the transmission frame received through the second virtual transmission line;
      a path switch configured to change transmission path information included in the transmission frame from the first virtual transmission line to the second virtual transmission line, upon receiving the transmission frame through the first virtual transmission line, and to change the transmission path information included in the transmission frame from the second virtual transmission line to the first virtual transmission line, upon receiving the transmission frame through the second virtual transmission line; and
      an interface configured to transmit the transmission frame including the transmission path information changed by the path switch to a virtual transmission line different from the virtual transmission line through which the transmission frame is received,
   wherein each of the plurality of transmission apparatuses includes:
      a branch interface configured to communicate with a terminal apparatus through a branch transmission line;
      a storage configured to store, for each terminal apparatus of a transmission source, a destination address for the first virtual transmission line and the destination address for the second virtual transmission line to be used to rewrite the destination address included in the received transmission frame when transmitting the transmission frame received through the branch interface to the first virtual transmission line and the second virtual transmission line; and
      an arithmetic device configured to refer to the storage and to rewrite the destination address for at least one of the transmission frame to be transmitted to the first virtual transmission line and the transmission frame to be transmitted to the second virtual transmission line, when transmitting the transmission frame received from the terminal apparatus through the branch interface to the ring-type network;
   wherein when the destination address is rewritten for at least one of the transmission frame to be transmitted to the first virtual transmission line and the transmission frame to be transmitted to the second virtual transmission line, the arithmetic device adds the destination address before the rewrite to an area other than an address area of the transmission frame; and
   wherein when the destination address is added to the area other than the address area of the transmission frame received from the first virtual transmission line and the second virtual transmission line, the path switch rewrites the destination address of the received transmission frame using the destination address.

2. The network system according to claim 1, wherein:
   when setting an address indicating address conversion by the path switch as the destination address of the transmission frame, the arithmetic device creates a transmission frame having a header portion including the destination address, a transmission source address, and the transmission path information representing the virtual transmission line, and a frame data portion to be output by the path switch as a frame after conversion, and
   upon receiving the transmission frame having the header portion and the frame data portion, the path switch converts the transmission frame into a transmission frame including the frame data portion in which the header portion is deleted.

3. The network system according to claim 1, wherein:
   when setting an address indicating address conversion by the path switch as the destination address of the transmission frame, the arithmetic device creates a transmission frame having a header portion including the destination address, a transmission source address, and the transmission path information representing the virtual transmission line, and a frame data portion to be output by the path switch as a frame after conversion, and
   upon receiving the transmission frame having the header portion and the frame data portion, the path switch converts the transmission frame into a transmission frame including the frame data portion in which the header portion is deleted.

4. The network system according to claim 1, wherein:
the storage further stores a destination address symbol that symbolizes the destination address of each terminal apparatus;
the arithmetic device creates a transmission frame by adding the destination address symbol that symbolizes an original destination address in place of the original destination address; and
when the destination address of the input transmission frame is the address indicating address conversion, the path switch converts the transmission path information representing the virtual transmission line in the transmission frame and converts the destination address of the transmission frame into the original destination address represented by the destination address symbol added to the transmission frame.

5. The network system according to claim 1, wherein:
the storage further stores a destination address symbol that symbolizes the destination address of each terminal apparatus;
the arithmetic device creates a transmission frame by adding the destination address symbol that symbolizes an original destination address in place of the original destination address; and
when the destination address of the input transmission frame is the address indicating address conversion, the path switch converts the transmission path information representing the virtual transmission line in the transmission frame and converts the destination address of the transmission frame into the original destination address represented by the destination address symbol added to the transmission frame.

6. The network system according to claim 1, wherein:
the arithmetic device adds an identification field storing a value representing same contents to the first transmission frame and the second transmission frame, and
the transmission apparatus further comprises a processor configured to select, based on the value of the identification field included in the received transmission frame, whether to output the transmission frame to the terminal apparatus or discard, when a destination of the transmission frame received from another transmission apparatus is the terminal apparatus connected to the transmission apparatus.

7. The network system according to claim 2, wherein:
the arithmetic device adds an identification field storing a value representing same contents to the first transmission frame and the second transmission frame, and
the transmission apparatus further comprises a processor configured to select, based on the value of the identification field included in the received transmission frame, whether to output the transmission frame to the terminal apparatus or discard, when a destination of the transmission frame received from another transmission apparatus is the terminal apparatus connected to the transmission apparatus.

8. The network system according to claim 3, wherein:
the arithmetic device adds an identification field storing a value representing same contents to the first transmission frame and the second transmission frame, and
the transmission apparatus further comprises a processor configured to select, based on the value of the identification field included in the received transmission frame, whether to output the transmission frame to the terminal apparatus or discard, when a destination of the transmission frame received from another transmission apparatus is the terminal apparatus connected to the transmission apparatus.

9. The network system according to claim 6, wherein when the value of the identification field included in the received transmission frame is the same as that of an already received transmission frame, the processor discards the received transmission frame.

10. The network system according to claim 6, wherein:
the arithmetic device sets, as the value of the identification field, a value that changes in accordance with a predetermined rule every time the transmission frame is output, and
when the value of the identification field included in the received transmission frame is the identification field value of a transmission frame to be output next to an already received transmission frame that has arrived previously, the processor selects the received transmission frame.

* * * * *